United States Patent
Justin et al.

(10) Patent No.: US 11,798,051 B2
(45) Date of Patent: *Oct. 24, 2023

(54) CONFIGURING FOOD-RELATED INFORMATION SEARCH AND RETRIEVAL BASED ON A PREDICTIVE QUALITY INDICATOR

(71) Applicant: GRUBHUB HOLDINGS INC., Chicago, IL (US)

(72) Inventors: Geopher Stephy Justin, Hillsborough, NJ (US); Patrick Gomes, Manhattan, NY (US); Arthi Murugesan, New York City, NY (US); Maria Belousova, New York, NY (US); Robert Trevelyan Waite, Lindenhurst, NY (US)

(73) Assignee: GRUBHUB HOLDINGS INC., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/707,410

(22) Filed: Mar. 29, 2022

(65) Prior Publication Data

US 2022/0284494 A1 Sep. 8, 2022

Related U.S. Application Data

(63) Continuation of application No. 17/007,856, filed on Aug. 31, 2020, now Pat. No. 11,288,726, which is a continuation of application No. 15/719,434, filed on Sep. 28, 2017, now Pat. No. 10,762,546.

(51) Int. Cl.
*G06Q 30/0601* (2023.01)
*G06Q 50/12* (2012.01)

(52) U.S. Cl.
CPC ..... *G06Q 30/0623* (2013.01); *G06Q 30/0635* (2013.01); *G06Q 50/12* (2013.01)

(58) Field of Classification Search
CPC . G06Q 30/0623; G06Q 30/0635; G06Q 50/12
USPC .......................................................... 705/15
See application file for complete search history.

(56) References Cited

U.S. PATENT DOCUMENTS

| | | | |
|---|---|---|---|
| 4,530,067 | A | 7/1985 | Dorr |
| 4,547,851 | A | 10/1985 | Kurland |
| 5,189,411 | A | 2/1993 | Collar |
| 5,272,474 | A | 12/1993 | Hilliard |

(Continued)

FOREIGN PATENT DOCUMENTS

| | | |
|---|---|---|
| EP | 0 844 579 | 5/1998 |
| EP | 0856 812 | 5/1998 |

(Continued)

OTHER PUBLICATIONS

Elite32 Restaurant System, Compuwave Technologies Inc., 2000.

(Continued)

*Primary Examiner* — Garcia Ade
(74) *Attorney, Agent, or Firm* — Baker Botts L.L.P.

(57) ABSTRACT

The disclosed technologies can compute predictive reorder scores and measures of the quality of food products and food providers using objectively verifiable data, including reorder data, and use these predictive quality measures to create new functionality in an information search and retrieval system and/or a product ordering system.

27 Claims, 10 Drawing Sheets

(56) References Cited

U.S. PATENT DOCUMENTS

| | | |
|---|---|---|
| 5,367,557 A | 11/1994 | Ozenbaugh |
| 5,510,979 A | 4/1996 | Moderi |
| 5,570,283 A | 10/1996 | Shoolery |
| 5,745,681 A | 4/1998 | Levine |
| 5,751,958 A | 5/1998 | Zweben |
| 5,774,670 A | 6/1998 | Montulli |
| 5,781,189 A | 7/1998 | Holleran |
| 5,835,896 A | 11/1998 | Fisher |
| 5,838,798 A | 11/1998 | Stevens |
| 5,839,115 A | 11/1998 | Coleman |
| 5,842,176 A | 11/1998 | Hunt |
| 5,845,263 A | 12/1998 | Camaisa |
| 5,850,214 A | 12/1998 | McNally |
| 5,899,502 A | 5/1999 | Del Giorno |
| 5,912,743 A | 6/1999 | Kinebuchi |
| 5,948,040 A | 9/1999 | DeLorme |
| 5,966,068 A | 10/1999 | Wicks |
| 5,970,474 A | 10/1999 | LeRoy |
| 5,991,739 A | 11/1999 | Cupps |
| 6,134,548 A | 10/2000 | Gottsman |
| 6,167,255 A | 12/2000 | Kennedy |
| 6,175,922 B1 | 1/2001 | Wang |
| 6,208,976 B1 | 3/2001 | Kinebuchi |
| 6,236,974 B1 | 5/2001 | Kolawa |
| 6,282,491 B1 | 8/2001 | Bochmann |
| 6,295,541 B1 | 9/2001 | Bodnar |
| 6,300,947 B1 | 10/2001 | Kanevsky |
| 6,341,268 B2 | 1/2002 | Walker |
| 6,356,543 B2 | 3/2002 | Hall |
| 6,366,650 B1 | 4/2002 | Kyung |
| 6,384,850 B1 | 5/2002 | McNally et al. |
| 6,415,138 B2 | 7/2002 | Sirola |
| 6,590,588 B2 | 7/2003 | Lincke |
| 6,594,347 B1 | 7/2003 | Calder |
| 6,836,537 B1 | 12/2004 | Zirngibl |
| 6,871,325 B1 | 3/2005 | McNally et al. |
| 6,873,693 B1 | 3/2005 | Langseth |
| 6,973,437 B1 | 12/2005 | Olewicz |
| 6,976,004 B2 | 12/2005 | Wittrup |
| 6,982,733 B1 | 1/2006 | McNally et al. |
| 7,069,228 B1 | 6/2006 | Rose |
| 7,216,152 B2 | 5/2007 | Short |
| 7,277,717 B1 | 10/2007 | Hart |
| 7,295,920 B2 | 11/2007 | Finkelstein |
| 7,359,871 B1 | 4/2008 | Paasche |
| 7,386,477 B2 | 6/2008 | Fano |
| 7,437,305 B1 | 10/2008 | Kantarjiev |
| 7,505,929 B2 | 3/2009 | Angert |
| 7,680,690 B1 | 3/2010 | Catalano |
| 7,953,873 B1 | 5/2011 | Madurzak |
| 7,966,215 B1 | 6/2011 | Myers |
| 8,073,723 B1 | 12/2011 | Bilibin et al. |
| 8,146,077 B2 | 3/2012 | McNally et al. |
| 8,326,705 B2 | 12/2012 | Niessen et al. |
| 8,341,003 B1 | 12/2012 | Bilibin et al. |
| 8,577,823 B1 | 11/2013 | Gadir |
| 8,595,050 B2 | 11/2013 | Scotto et al. |
| 10,366,434 B1* | 7/2019 | Belousova ......... G06Q 30/0627 |
| 2001/0047301 A1 | 11/2001 | Walker |
| 2002/0005430 A1 | 1/2002 | Pentel |
| 2002/0046093 A1 | 4/2002 | Miller |
| 2002/0107747 A1 | 8/2002 | Gerogianni |
| 2002/0143655 A1 | 10/2002 | Elston |
| 2002/0161604 A1 | 10/2002 | Kardos |
| 2002/0178034 A1 | 11/2002 | Gardner |
| 2003/0125963 A1 | 7/2003 | Haken |
| 2005/0004843 A1 | 1/2005 | Heflin |
| 2005/0049940 A1 | 3/2005 | Tengler |
| 2006/0010037 A1 | 1/2006 | Angert et al. |
| 2006/0020497 A1 | 1/2006 | Mcnally |
| 2006/0020614 A1 | 1/2006 | Kolawa |
| 2006/0069578 A1 | 3/2006 | Borkowski et al. |
| 2006/0080176 A1 | 4/2006 | Sutcliffe |
| 2007/0011061 A1 | 1/2007 | East |
| 2007/0150375 A1 | 6/2007 | Yang |
| 2007/0294129 A1 | 12/2007 | Froseth et al. |
| 2008/0076451 A1 | 3/2008 | Sheha et al. |
| 2008/0104059 A1 | 5/2008 | Segel |
| 2008/0262972 A1 | 10/2008 | Blake |
| 2008/0319864 A1 | 12/2008 | Leet |
| 2009/0048890 A1 | 2/2009 | Burgh |
| 2009/0099972 A1 | 4/2009 | Angert et al. |
| 2009/0106124 A1 | 4/2009 | Yang |
| 2009/0150193 A1 | 6/2009 | Hong |
| 2009/0164897 A1 | 6/2009 | Amer-Yahia |
| 2009/0167553 A1 | 7/2009 | Hong |
| 2009/0204492 A1 | 8/2009 | Scifo et al. |
| 2009/0307096 A1 | 12/2009 | Antonellis |
| 2009/0319166 A1 | 12/2009 | Khosravy et al. |
| 2010/0070376 A1 | 3/2010 | Proud et al. |
| 2010/0250384 A1 | 9/2010 | Bhargava |
| 2010/0268620 A1 | 10/2010 | Angert |
| 2011/0040642 A1 | 2/2011 | O'Dell |
| 2011/0109435 A1 | 5/2011 | Bickel |
| 2011/0113040 A1 | 5/2011 | Bickel |
| 2011/0161137 A1 | 6/2011 | Ubalde et al. |
| 2011/0191194 A1 | 8/2011 | Lutnick |
| 2011/0208617 A1 | 8/2011 | Weiland |
| 2011/0218839 A1 | 9/2011 | Shamaiengar |
| 2011/0258011 A1 | 10/2011 | Burns |
| 2011/0282858 A1 | 11/2011 | Karidi |
| 2012/0239683 A1 | 9/2012 | Starkman |
| 2012/0290413 A1 | 11/2012 | Harman |
| 2013/0038800 A1 | 2/2013 | Yoo |
| 2013/0103605 A1 | 4/2013 | Villegas |
| 2013/0110582 A1 | 5/2013 | Starkman |
| 2013/0144730 A1 | 6/2013 | Harman |
| 2013/0144764 A1 | 6/2013 | Walling, III |
| 2013/0159331 A1 | 6/2013 | Zhang |
| 2013/0166347 A1 | 6/2013 | Scotto |
| 2013/0311311 A1 | 11/2013 | Chopra |
| 2013/0325641 A1* | 12/2013 | Brown ............... G06Q 30/0631 705/15 |
| 2014/0025524 A1 | 1/2014 | Sims et al. |
| 2014/0080102 A1 | 3/2014 | Krishna |
| 2015/0052098 A1 | 2/2015 | Kveton |

FOREIGN PATENT DOCUMENTS

| | | |
|---|---|---|
| EP | 1 081 625 | 7/2001 |
| JP | 62-050919 | 3/1987 |
| JP | 5-40767 | 2/1993 |
| JP | 6-52195 | 2/1994 |
| JP | 6-203051 | 7/1994 |
| JP | 9-160972 | 6/1997 |
| JP | 9-204466 | 8/1997 |
| JP | 9-296819 | 11/1997 |
| JP | 9-325988 | 12/1997 |
| JP | 9-330470 | 12/1997 |
| JP | 10-011194 | 1/1998 |
| JP | 10-224549 | 8/1998 |
| JP | 11-126147 | 5/1999 |
| JP | 11-191035 | 7/1999 |
| JP | 11-202974 | 7/1999 |
| WO | WO 95/34040 | 12/1995 |
| WO | WO 97/08635 | 3/1997 |
| WO | WO 98/35311 | 8/1998 |
| WO | WO 99/17236 | 4/1999 |
| WO | WO 2001/071617 | 9/2001 |

OTHER PUBLICATIONS

Micro Systems, Inc., 8700 HMS Product Overview, Micro Systems, Inc., 2000.

Len Lewis, Opening the gates, Progressive Grover, Jul. 1998.

Krishna Bharat, Migratogy Applications.

Kevin Crowston, Understanding Processes in Organizations, Jul. 1998.

Kato Kiyosh, A Prototype of a User Interface Software for Portable Terminal with a Small Display Screen, Information Processing Society of Japan (IPSJ) The 53rd National Convention.

(56) References Cited

OTHER PUBLICATIONS

Kambe Tomonari, Screen design simulator "U-face", Information Processing Society of Japan (IFSJ) The 39th National convention colleciton of papers 1457-1458, Oct. 16, 1989.
John Soeder, Cyber Solicitation, Restaurant Hospitality, Sep. 1997.
Jennifer Rowley, Internet food retailing: the UK in context, ProQuest LLC, 1998.
IBM, Pos Computer, 1998.
eshop.com, eShop Technology, eshop.com, Jan. 1, 1996.
A Chavez, A real-life experiment in creating an agent marketplace, PAAM, 1997.
Engaging Customers Across All Touch Points: A Roadmap for Leading Retailers, Blue Martini Software, Inc., www.bluemartini.com.
Micro Systems, Inc., Full Service Operations, Micro Systems, Inc., Nov. 11, 1996.
Compuware Technologies Approved as Supplier to McDonald's Canda, Compuwave Technologies Inc., Sep. 14, 2000.
Chuck Andraka, Put your database on the Web, Data Based Advisor, v14, n6, p. 12, Jun. 1996.
Chapter 4—Wireless Data, Wireless Technologies and the National Information Infrastructure, Diane Pub Co, Oct. 1995.
Carrie Lehman, Service connects restaurants, customers via orders by Internet, Alaska Journal of Commerce, Apr. 28, 1997.
Business Editors, Fujitsu and Sulcus Hospitality Group partner to develop first Wireless computer for restaurant industry, Business Wire, Aug. 30, 1993.
Brew Moon Management Toasts SQUiRREL's "Seamless Solution", SQUiRREL Systems, Nov. 1998.
Barron Housel, WebExpress: a system for optimizing web browsing in a wireless environment.
Arthur Keller, The DIANA approach to mobile computing, CiteSeer, 1995.
Andrew Fano, Shopper's Eye: Using Lcoation-based filtering for a shopping agent in the physical world, 1998.
Accel Partners Invest $10 Million incybermeals, Business Wire, May 28, 1998.
About US, Compuwave Technologies Inc., Feb. 7, 2001.
eshop.com, eShip Technology Merchant Manual, eShop.com, Feb. 21, 1996.
Rita Marie Emmer, Marketing Hotels: Using Global Distribution System, Cornell Hotel and Restaurant Administration Quarterly, 1993, 34; 80, DOI: 10.1177/001088049303400614.
Wireless POS Drive-Through System, Compuwave Technologies Inc., 2000.
T. Imielinski, Adaptive Wireless Information Systems, 1994.
Sulcus's Sguirrel and cybermeals Ink Technology Alliance, Business Wire, Feb. 24, 1998.
Steven Vaughan-Nichols, Unleashing Databases on the Web—True wealth and power belong to those who control information access, Netguide, 1996, n307, p. 111.
Squirrel Systems, Squirrel.RTM. Customer Profile: Chevys Fresh Mex.RTM., Squirrel Systems—Restaurant Management, Aug. 1998.
Squirrel Systems, Squirrel Restaurant Management System.
Squirrel Systems, Press Releases, Squirrel Systems, Aug. 20, 1998.
Squirrel Systems, POS System, May 8, 1999, http://web.archive.org/web/19990508175824/www.squirrelsystems.com/product- s/newsq . . . .
Squirrel Systems, May 8, 1999, http://web.archive.org/web/19990508153731/www.squirrelsystems.com/about/c- ompany.
Squirrel point-of-sale software, Squirrel Systems, Oct. 10, 1999.
Robin Berger, POS Positions Spago for Growth, Sguirrel Systems, Apr./May 1997.
Micro Systems, Inc., All About US, Micro Systems, Inc., Nov. 11, 1996.
RMS Touch, Company Profile RMS, Touch.com, Integrated Restaurant Software, Feb. 15, 1997.
Micro Systems, Inc., Appendix, User's Manual, 8700 HMS Version 2.10, micros Systems, Inc., 1995-1997.
Richard De Santa, Are you into your customers?, Supermarket Business, Jan. 1997.
Rev Share Information, Cybermeals, Jan. 24, 1998.
POS Infrared Restaurant System, Compuwave Technologies Inc., 2000.
P. L. Olympia, Cold Fusion 1.5; Autobahn, DBMS, v9, n8, p. 33, Jul. 1996.
Micros Systems, Inc., POS Configprator User's Guide, 3700 POS, Micros Systems, Inc., 1998.
Micros Systems, Inc., New Products, Micros Systems, Inc., Nov. 11, 1996.
Micro Systems, Inc., The Micro 2700 HMS Touchscreen, Micro Systems, Inc.
Micro Systems, Inc., Quick Service Operations, Micro Systems, Inc., Nov. 11, 1996.
Micro Systems, Inc., Micros Hand-Held TouchScreen, Micro Systems, Inc., Sep. 1992.
Micro Systems, Inc., Full Service Operations, MICROS 3700 Point-of-Sale System, Micro Systems, Inc., Nov. 11, 1996.
Wireless Restaurant System, Compuwave Technologies Inc., Feb. 7, 2001.
RMS Touch, RMS-Touch—Touch Screen Restaurant Management System Product Description, RMSTouch.com, Feb. 15, 1997.
U.S. Appl. No. 14/520,901, filed Oct. 22, 2014, Office Action, dated Jun. 1, 2017.
U.S. Appl. No. 14/520,901, filed Oct. 22, 2014, Final Office Action, dated Oct. 21, 2016.
Justin, U.S. Appl. No. 15/719,434, filed Sep. 28, 2017, Office Action, dated Sep. 6, 2019.
Justin, U.S. Appl. No. 15/719,434, filed Sep. 28, 2017, Notice of Allowance, dated Jan. 9, 2020.
Justin, U.S. Appl. No. 15/719,434, filed Sep. 28, 2017, Interview Summary, dated Dec. 12, 2019.
Belousova, U.S. Appl. No. 14/520,901, filed Oct. 22, 2018, Interview Summary, dated Jun. 18, 2018.
Belousova, U.S. Appl. No. 14/520,901, filed Oct. 22, 2014, Office Action, dated Jul. 17, 2015.
Belousova, U.S. Appl. No. 14/520,901, filed Oct. 22, 2014, Office Action, dated Mar. 27, 2018.
Belousova, U.S. Appl. No. 14/520,901, filed Oct. 22, 2014, Notice of Allowance, dated Sep. 14, 2018.
Belousova, U.S. Appl. No. 14/520,901, filed Oct. 22, 2014, Interview Summary, dated Mar. 5, 2018.
Belousova, U.S. Appl. No. 14/520,901, filed Oct. 22, 2014, Final Office Action, dated Dec. 8, 2017.
Belousova, U.S. Appl. No. 14/520,901, filed Oct. 2, 2014, Interview Summary, dated Jun. 26, 2018.

* cited by examiner

CONFIGURING FOOD-RELATED INFORMATION SEARCH AND RETRIEVAL BASED ON A PREDICTIVE QUALITY INDICATOR

BENEFIT CLAIM

This application claims the benefit and priority under 35 U.S.C. § 120 as a continuation of U.S. patent application Ser. No. 17/007,856, filed Aug. 31, 2020, which is a continuation of U.S. patent application Ser. No. 15/719,434, filed Sep. 28, 2017, now U.S. Pat. No. 10,762,546 issued Sep. 1, 2020, the entire contents of which are incorporated herein by this reference for all purposes as if fully set forth herein. Applicant rescinds any disclaimer of subject matter that may have occurred in prosecution of the parent application and advises the USPTO that the claims in this application may be broader than previously presented.

TECHNICAL FIELD

The present disclosure relates to computer-implemented information and retrieval systems, and relates more particularly to food product ordering systems with information search and retrieval capabilities.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

Computer-implemented food product ordering systems often provide or communicate with an information search and retrieval interface. The search and retrieval interface is used for searching and browsing information that depicts or describes food providers and/or items of food that are available for purchase. Examples of food providers include restaurants, grocery stores, and food delivery services. Examples of food items include made-to-order food, packaged food, and grocery items. The search and retrieval interface communicates on a network with an electronic transaction processing system to effectuate online ordering and purchases of food items that are selected in the interface.

Some food product ordering systems include or communicate on a network with computer-implemented delivery systems to arrange for delivery of the ordered food items to geographic locations that may be specified in or associated with the electronic food orders.

SUMMARY

The appended claims may serve as a summary of the present invention.

Figure 1A:
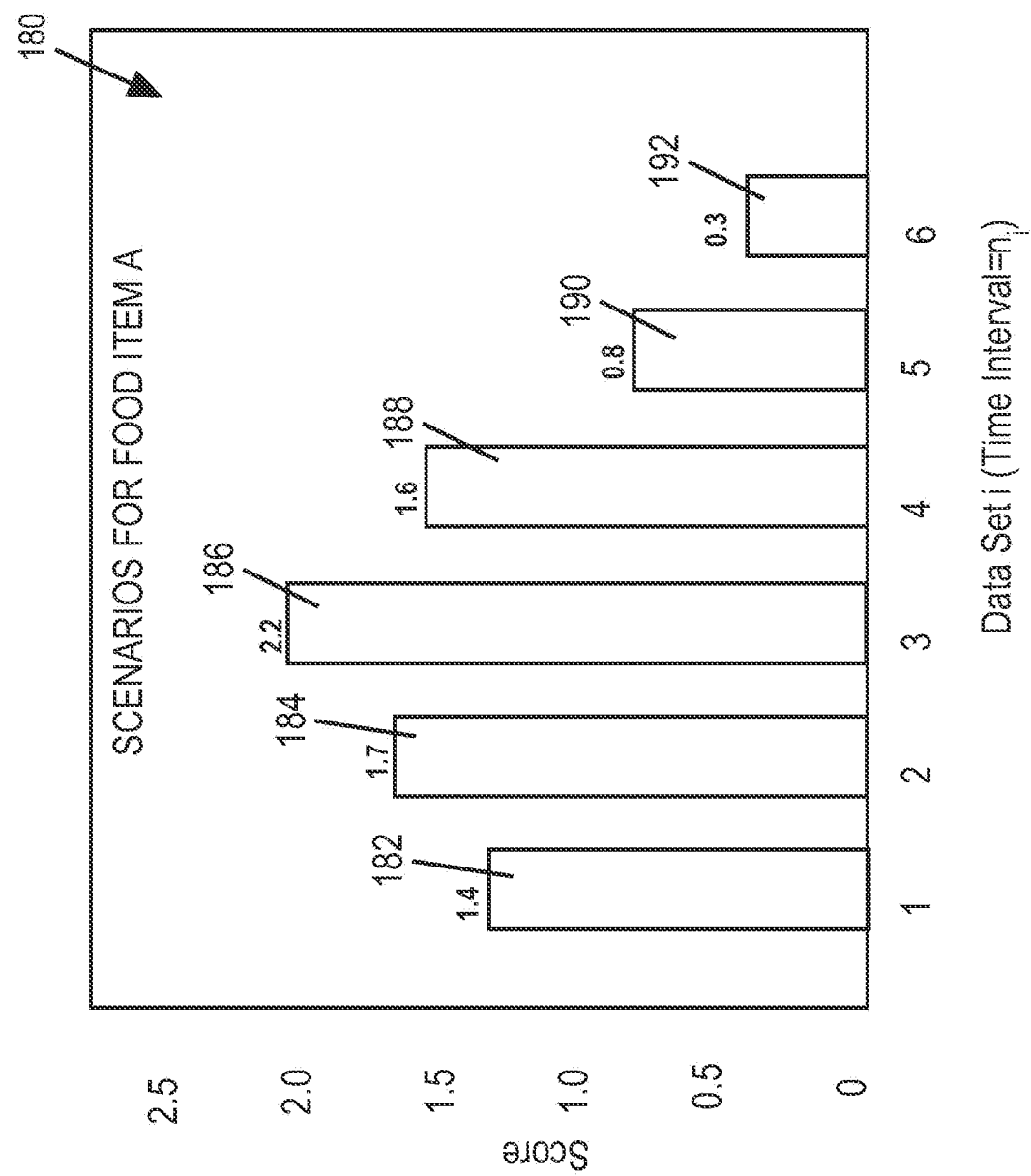
FIGS. 1A, 1B, and 1C are example plots of food reorder data.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

Search engines and recommender systems are often programmed to retrieve and display, and even highlight, highly rated or highly relevant items based on a search query. In food ordering systems, however, relevance to a search term and subjective rankings may not be reliable predictors of the customer experience with food that is ordered in relation to the quality of the food.

Food ordering systems can collect food-related data during online food ordering processes and store the food-related data in relational databases or other data repositories for separate analysis. For example, food ordering systems often collect, by input devices, and store in computer memory, structured data and/or unstructured data that subjectively describes an experience that a user has had with an item that was ordered using the system and associate the data with a user account identifier. Structured or unstructured data also may be acquired through other kinds of signals such as reviews, text messages sent in response to survey messages, email messages, customer service ticket systems, or comment fields in a food delivery order record.

Examples of structured data include inputs that are received through an input device interacting with an input block of a computer-generated graphical user interface that is displayed on a display device, where the input block is programmed to enforce strict rules about the length, size, type, and/or format of the input. Such rules may be enforced by programming the interface to implement graphical elements like pull-down menus and selectable elements such as buttons or slide bars. These structured-data inputs may be displayed as numerical values or graphical ratings such as star ratings.

Examples of unstructured data include natural language or free text comments, audio files, digital images and digital videos. Unstructured data may be received in user reviews of restaurants, email or text responses from user devices, or forums or chat services. The particular mechanism of inputting or receiving structured or unstructured data is not critical and this description presumes that a networked server computer is programmed to receive signals of structured or unstructured data in the types described above as examples. While these kinds of structured and/or unstructured data can provide indications of food quality, they are difficult to accurately and reliably quantify because they are subjective in nature and can be prone to human tendencies such as inaccuracies, exaggeration and even fabrication of fake comments or ratings.

As described in this disclosure, quantitative data collection and analysis methods can be implemented on a networked computing system to improve information search and retrieval capabilities and/or to supplement other more subjective food-related quality indicators that are generated and displayed by a food ordering system.

The technologies described in this document can ingest large volumes of objectively verifiable longitudinal food-related data, such as reorder data, and apply one or more mathematical algorithms, such as a probabilistic or a statistical algorithm, to the ingested data to compute sets of predictive reorder scores and/or quality measures and create a predictive food quality model. The food quality model can be used to link the computed predictive reorder scores and/or quality measures of quality with food providers, food items, and/or categories of food items. Examples of predictive reorder scores and/or quality measures include computed numerical scores, percentages, ratios, and trends.

"Objectively verifiable" as used in this disclosure may refer to data whose accuracy can be established or confirmed by evidence. For example, a count of the number of times a food dish has been ordered from a certain restaurant can be evidenced by the data associated with each of the individual orders.

Longitudinal as used in this disclosure may refer to data that is collected over an interval of time, such as days, weeks, or months, or during a certain season of the year, where the interval of time is determined to satisfy a level of confidence in the predictions that are made based on the data. Computed as used in this disclosure may refer to data that results from operation of an algorithm on input data as opposed to raw data inputs.

Another example of objectively verifiable data is numerical food item reorder data. Reorder data as used in this disclosure may refer to the number of times a food item has been ordered more than once by the same computer user account through the same food provider account. For example, if a food ordering system receives an electronic order for a large cheese pizza from computer user account 123 on June 1 and then receives another electronic order for a large cheese pizza from the same computer user account on July 1, then the order received on July 1 would be counted as one reorder for user account 123.

Using the disclosed technologies, food item reorder data can be aggregated over selected time intervals, for a single user account, across multiple user accounts, and across multiple accounts of food providers such as restaurants. "Account" as used in this disclosure may refer to a computer login that is accessed by a unique identifier and password, where a successful login enables operations, such as online information searching and purchases of food, to be performed by the food ordering system in connection with the account.

Other advantages of the disclosed approaches include: food quality can be quantified based on patterns of reorder data; dynamically changing implicit quality influencers are reflected in the reorder scores; food quality measures can be kept current while ensuring sufficient data to have significant confidence to be reliable; accurate/comparable measures of quality can be obtained across restaurants of different sizes and order volumes (for example, to be able to compare food quality between a restaurant in Manhattan that may sell 5000 orders a day and a restaurant in a rural location that only sells 20 a day); new restaurants or new menu items that have few reorders are treated fairly by the algorithms that minimize the effects of reorder volume; use of the reorder score to arrive at "best in class" items and best restaurant indications.

Figure 1B:
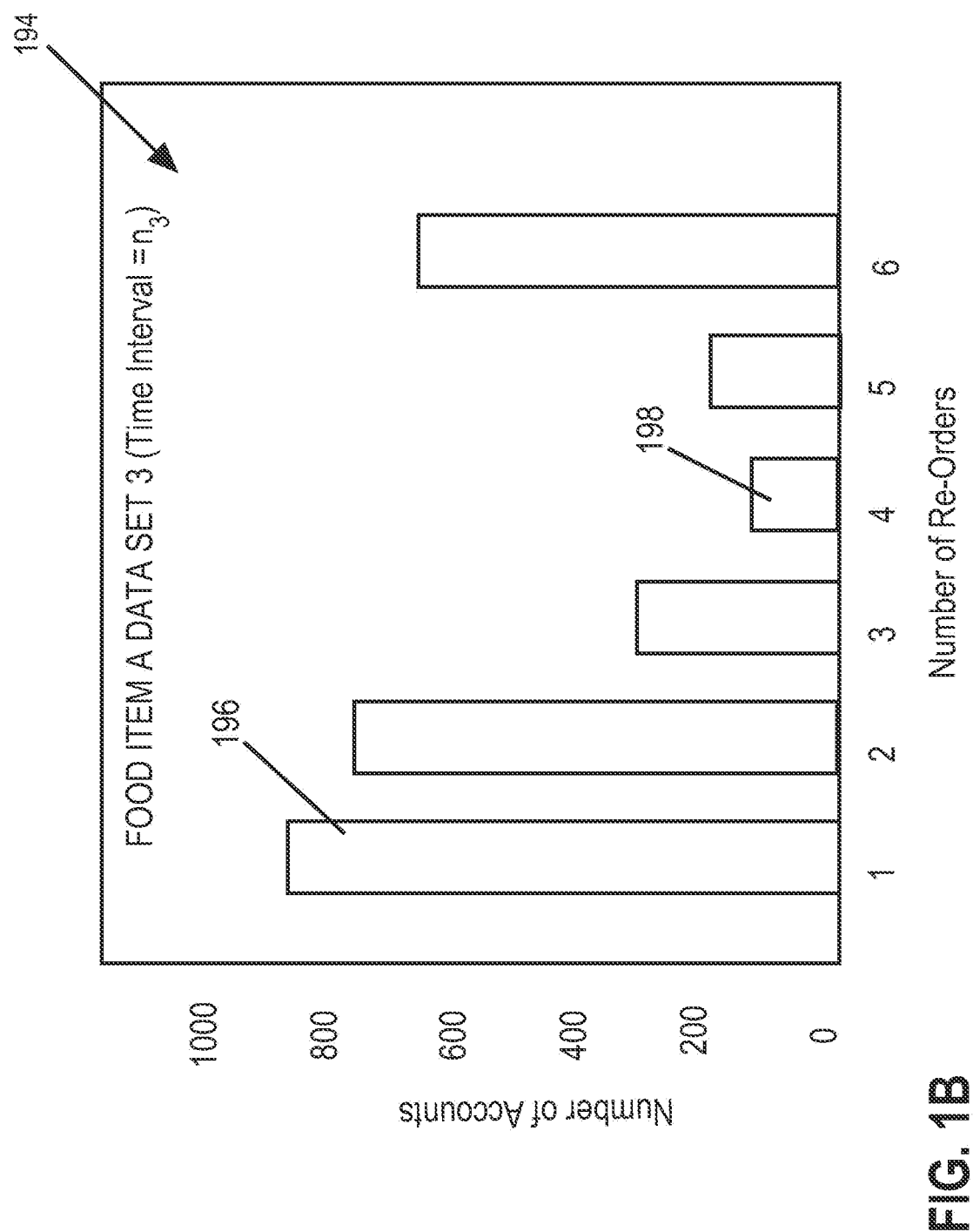
Figure 1C:
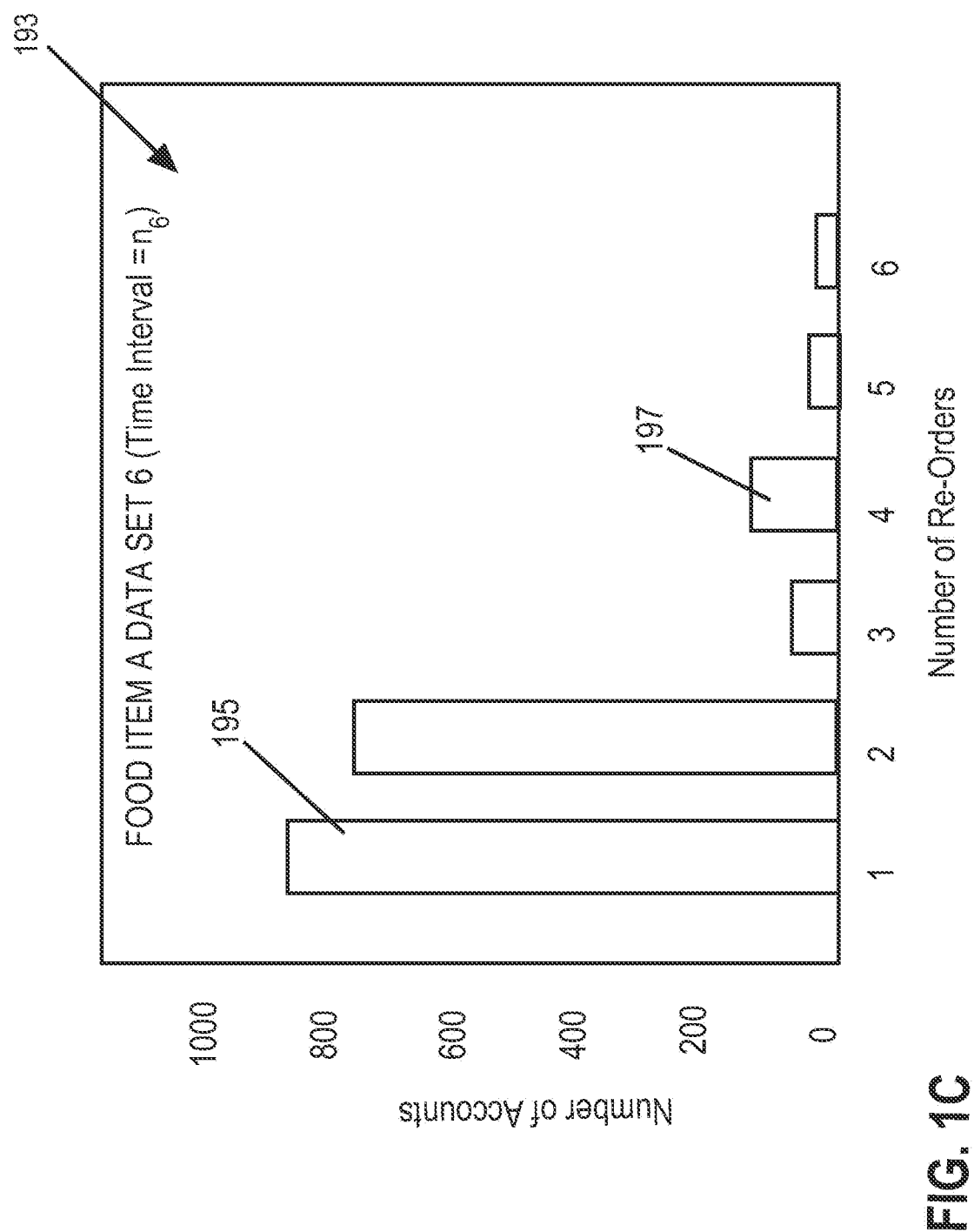

FIGS. 1A, 1B, and 1C are example visualizations of reorder data.

In FIG. 1A, a plot 180 shows vertical bars 182, 184, 186, 188, 190, 192, which each represent an expected reorder score that has been computed for a different possible reordering scenario for a given food item, A. The term scenario as used herein may refer to a set of parameters used to define a data set of reorder data. Examples of parameters that may be used to define a data set include food item, food category, time interval for collecting data samples (for example, counts of reorders), food provider, food provider category, geographic region, time of day, time of year (or season).

Thus, in FIG. 1A, a data set i (where i is a positive integer from 1 to the number of data sets, 6, in the example) includes reorder data that has been collected for the food item A during a time interval such that individual data sets include data collected over different but potentially overlapping time intervals. The length (or duration) of the particular time interval $n_i$ can be adjusted to help reveal trends in the reorder data over time. For example, defining the time interval as a month could reveal month-to-month changes in reorder scores that would not be apparent if the time interval were longer (such as quarterly or yearly).

The time interval and/or other parameters of a scenario can be adjusted so as to reveal the effect of dynamic events that explicitly or implicitly influence the quality of a food item. Examples of potential quality influencers include changes in the head chef of a restaurant, the opening of a new restaurant nearby, seasonal menus or trends, short-term events such as holiday parties, meetings, and conventions, changes in raw material procurement (such as a shortage of avocados), the introduction of new menu items or the 'retiring' of older menu items, and many others.

The expected reorder score for each data set can be calculated using the methods described below. In the illustration, a higher reorder score indicates a higher probability or statistical likelihood that the food item will be reordered, and a lower reorder score indicates a lower probability or statistical likelihood that the food item will be reordered.

An aggregation of food reorder data can be graphically represented as, for example, a histogram. The histogram represents the distribution of the numerical reorder data by grouping the numerical data into ranges (here, defined by the reorder count). Examples of histograms of food reorder data are shown in FIGS. 1B and 1C. In FIGS. 1B and 1C, each vertical bar represents a count of the number of user accounts that have reordered the FOOD ITEM A a certain number of times within a defined time interval where the number of times reordered is indicated on the x-axis and the number of computer user accounts doing the reordering of the FOOD ITEM within the time interval $n_t$ is indicated on the y-axis of the plot. For example, vertical bar 196 indicates that over 800 accounts (where an account is a computer login account operated by an end user/diner) have reordered the FOOD ITEM A one time. Data represented in such a histogram can be used by the disclosed technologies to estimate the probability distribution of reorders.

In more detail, FIGS. 1B and 1C illustrate reorder count data evidencing two of the reorder scenarios shown in FIG. 1A. FIG. 1B shows a plot 194 of an example of reorder data that could evidence the reorder score for data set 3 shown by vertical bar 186 in FIG. 3A. For instance, vertical bar 196 illustrates a relatively high number of computer user accounts reordered the food item A once during time interval $n_3$ and a much lower number of computer user accounts reordered food item A four times during the time interval $n_3$.

Similarly, FIG. 1C shows a plot 193 of an example of reorder data that could evidence the reorder score for data set 6 shown by vertical bar 192 in FIG. 1A. In FIG. 1C, vertical bar 195 shows a relatively high number of computer user accounts reordered food item A once during the time interval $n_6$ and a much lower number of computer user accounts reordered food item A 4 times during time interval $n_6$.

Even though the plots 194, 193 have similar characteristics for reorder counts of 1 and 4 (i.e., vertical bars 196, 195, and vertical bars 198, 197 are similar in magnitude, respectively), other characteristics of the plots are quite different, contributing to the differences in the reorder scores shown in FIG. 1A (i.e. compare vertical bars 186 and 192). The technologies disclosed in this document can analyze the data represented by these plots and draw inferences about the characteristics of the data sets or influencers of reorder behavior.

FIGS. 1A, 1B, and 1C are provided to illustrate a clear example of reorder data; however, embodiments of the solutions in this disclosure are not required to actually generate, store or display these visualizations as part of execution or operation.

In an embodiment, the disclosed technologies provide numerous benefits such as improved analysis of historical reorder data using statistical inference methods such as Bayesian prediction techniques, identifying reorder trends, and calculating predictions of future reorders of a given food item or category of food items. The disclosed technologies can use these predictive measures to improve or add new functionality to a food information search and retrieval system and/or a food ordering system, for example to add new capabilities to a display of food-related data or to improve the efficiency of a search engine. Other benefits are set forth below or will be apparent from study of the disclosure as a whole.

Environment Overview

Figure 1D:
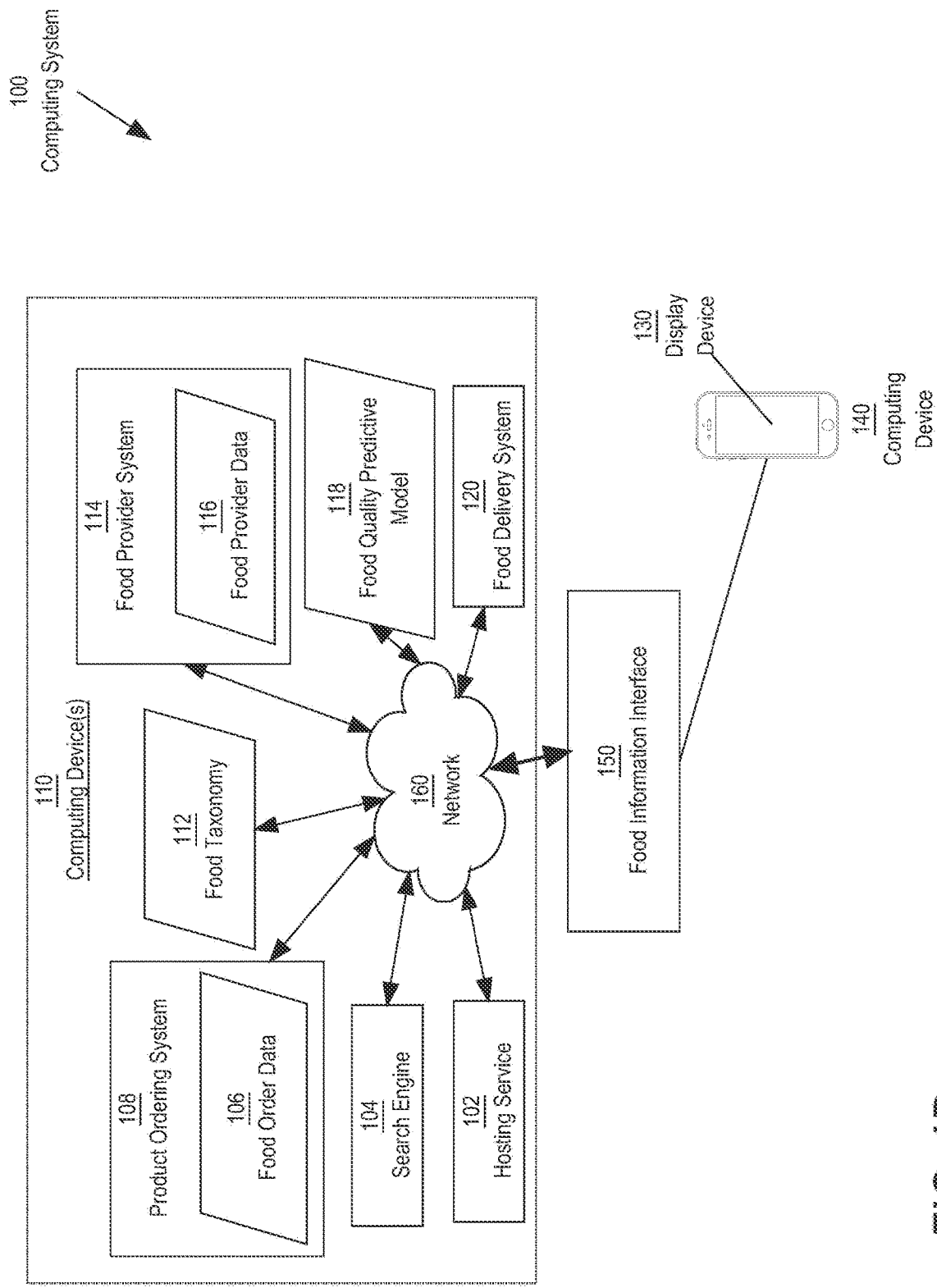
FIG. 1D is an example block diagram illustrating one or more embodiments of a computing environment including one or more electronic components in which aspects of the present disclosure may be implemented.

FIG. 1D is an example block diagram illustrating one or more embodiments of a computing environment including one or more electronic components in which aspects of the present disclosure may be implemented.

In the embodiment of FIG. 1D, computing system 100 includes computing device(s) 110 and computing device 140, which are communicatively coupled to an electronic communications network 160. Implemented in computing devices 110, 140 using computer software, hardware, or software and hardware, are combinations of automated functionality, data structures, and digital data, which are represented schematically in FIG. 1D as hosting service 102, search engine 104, food order data 106, product ordering system 108, food taxonomy 112, food provider system 114, food provider data 116, food quality predictive model 118, food delivery system 120 and food information interface 150. System as used in this disclosure may refer to a single computer or network of computers and/or other devices. Computing device as used in this disclosure may refer to a computer or any other electronic device that is equipped with a processor.

Although computing system 100 may be implemented with any number N (where N is a positive integer) of hosting services 102, search engines 104, food order data 106, product ordering systems 108, food taxonomies 112, food provider systems 114, food provider data 116, food quality predictive models 118, food delivery systems 120, food information interfaces 150, computing devices 110, and computing devices 140, respectively, in this disclosure, these elements may be referred to in the singular form for ease of discussion.

Also, hosting service 102, search engine 104, food order data 106, product ordering systems 108, food taxonomy 112, food provider system 114, food provider data 116, food quality predictive model 118, food delivery system 120, food information interface 150 are shown as separate elements in FIG. 1D for ease of discussion but the illustration is not meant to imply that separation of these elements is required. The illustrated systems (or their functionality) may be divided over any number of physical systems, including a single physical computer system, and can communicate with each other in any appropriate manner.

In environment 100, at least search engine 104 is hosted by a hosting service 102. Product ordering system 108, food taxonomy 112, food provider system 114, food quality predictive model 118 and food delivery system 120 may be hosted by the same hosting service as search engine 104 or different hosting service(s). Hosting service(s) 102 enable network access to food order data 106, food taxonomy 112, food provider data 116, food quality predictive model 118 and food information interface 150 by other computing services on the network 160.

The example food information interface 150 is communicatively coupled to computing device 140 and to network 160. In some embodiments, computing device 140 is a client computing device, such as an end user's smart phone or laptop machine, and computing device 110 is a server computer or network of server computers located on the Internet, in the cloud. As illustrated in FIG. 1D, a display device 130 is implemented in computing device 140 but may be implemented as a separate device or as part of another device, or as multiple networked display devices, in other implementations.

The food information interface 150 includes combinations of computer-implemented functionality, logic, data structures, and digital data, which are represented schematically in FIG. 1E, described below. In operation, computing device 140 operates food information interface 150 to establish logical connection(s) over network 160 with product ordering system 108 or food provider system 114 or search engine 104 or hosting service 102 or food taxonomy 112 or food quality predictive model 118 or food delivery system 120, as needed in order to configure information search and retrieval and/or food ordering processes in accordance with predictive measure(s) that are generated by a food analytics subsystem 170, described below.

For example, food information interface 150 coordinates operation of search engine 104, product ordering system 108, food provider system 114, food delivery system 120 and food analytics subsystem 170 so that a hungry computer user can use the disclosed predictive measures to cause his or her computer account to proceed seamlessly and efficiently from searching for and browsing available food options to placing a food order to be filled by a food provider and delivered to the end user. Alternatively, or in addition, in some implementations, food information interface 150 provides a display of predictive measures, such as a dashboard, which can be used by restaurants and other food providers or other participants in the supply chain to predict demand for certain food products, identify food products that are rising and declining in quality over time, and obtain feedback on their offerings, where the feedback is based on objectively verifiable data.

Logical connection as used in this disclosure may refer to a flow of digital information or data communication that is established between two devices on a network by network software communicating with, for example, the devices' operating systems either directly or by a virtual machine. Examples of protocols that may be used to establish logical network connections include hypertext transfer protocol (HTTP) and secure sockets layer (SSL).

Search engine 104 when executed by a processor provides information search and retrieval capabilities, for example keyword searching of indexes, metadata, databases, web pages and other content stored on the network 160, and retrieval and display of search results. Search engine 104 can be implemented as a generic search engine that can search many types of data sources or as a domain-specific search engine that is limited to searching a specific set of data sources. For example, search engine 104 may be configured specifically for search and retrieval of food-related data stored in food provider data 116 or food order data 106, using food taxonomy 112.

Product ordering system 108 when executed by a processor provides product ordering capabilities. For example, once a product of interest is found using search engine 104, product ordering system 108 can collect order information, generate an electronic order and transmit the order to the provider of the ordered product electronically over the network 160. Product ordering system 108 can be implemented as a generic ordering service or as a domain-specific ordering system. For example, product ordering system 108 may be configured specifically for ordering food items from restaurants and/or other food providers.

Product ordering system 108 creates and stores, for example in a searchable database or other suitable data structure, food order data 106. Food order data 106 includes data associated with electronic orders of food, for example descriptions of made-to-order food items and/or other food products. Food order data 106 includes unique identifiers for each food order and each item in the order, the computer account placing the order, the food provider account to which the order is directed, date and time of order placed, and quantity data for individual items of the food order. Food order data 106 may also include special food preparation instructions and/or delivery instructions. Food order data may be linked with food taxonomy 112, so that food items included in food orders are linked with certain labels (such as classes or categories) in food taxonomy 112.

Food taxonomy 112 provides a computer-implemented vocabulary of labels for food items, food products and food providers, and defines relationships between food-related labels at different levels of abstraction. Food taxonomy 112 also associates attributes with data labels. Food taxonomy 112 may be implemented as for example a hierarchical data structure such as an ontology or a directed graph, where a node in the graph represents a label and the node has a set of attributes. Food taxonomy 112 may be implemented as a data model or as an ontology using a computer-implemented data structure such as a tree, database or table.

Labels representing higher levels of abstraction may be represented at higher levels in the graph for example by root nodes, while labels representing lower levels of abstraction may be represented at lower levels in the graph for example by child nodes.

As an example, food taxonomy 112 may include the following labels: dish, dish category, menu item, menu item category and restaurant class, where dish category is a root node and a label associated with the dish category node may be defined as a normalized or canonical label for a group of similar consumable items, an example of which may be Salad. Other types of abstractions that may be implemented with labels in food taxonomy 112 include dietary tags, health tags, cuisine tags, and many others, which may be defined based on the requirements of a particular design or implementation of the disclosed technologies.

Labels can be instantiated with instances of data, for example Salad and Soup are instances of the dish category label. Thus, when populated with data items (or instantiated), food taxonomy 112 may include both labels and instances of labels.

Continuing the example, in food taxonomy 112, dish may be a child of dish category with the relationship between dish category and dish represented by a link or edge connecting the two nodes. Dish may be defined as a normalized or canonical label for a consumable item, an example instance of which may be Caesar salad.

Food taxonomy 112 may be used to classify variable data, for example in the case where two different restaurants have different names for the same dish or a restaurant has multiple variations of the same dish. To do this, food taxonomy 112 may include the label menu item category and a link between menu item category and dish.

Menu item may be defined as a variable label for a consumable item as the item appears in a particular restaurant menu. In other words, menu items are the singular names for items that are offered (e.g., listed on a menu) by a particular restaurant. Instances of menu item may include Charred Romaine salad with house-made Caesar dressing and House Caesar salad, both of which could be classified as Caesar Salad, a dish.

Similarly, food taxonomy 112 may be used to classify other variable data, such as in the case where a restaurant has multiple offerings in the same category. Menu category may be defined as a variable label for a group of similar consumable items as it appears in a particular restaurant menu. An instance of menu category for a particular food provider may be Entrée-sized Salads (but another restaurant may use Dinner Salads as the menu category for similar items). In food taxonomy 112, a menu category of a particular restaurant may be linked with a normalized dish category, for example entrée-sized salads may be linked with the normalized or canonical label, Salad.

Food taxonomy 112 may be used to classify restaurants and/or other food providers. For example, food taxonomy 112 may include restaurant class, a label for a group of restaurants that are similar in cuisine, menu, service area, customer class or other factors, such that it makes sense to compare them. Example instances of restaurant class include Wood-fired Thin Crust Pizza Places, Elegant Contemporary European, Asian, Downtown, Brunch. Food taxonomy 112 enables the analytical techniques and technologies described herein to be performed for individual restaurants or across multiple restaurants, and for individual dishes or across multiple different types of dishes within the same restaurant.

Food provider system 114 is part of or interfaces with product ordering system 108. For example, food provider system 114 maintains food provider data 116, which includes descriptions and specifications for food items that are offered for purchase through the electronic system implemented in computing system 100. Food provider system 114 may store and monitor changes in food provider data 116, for example, price and availability of menu items, graphics and text descriptions of menu items, and ratings data 105. Food provider data 116 may further include information about the food provider itself, such as name, location, business hours, and contact information. Portions of food provider data 116 and/or food order data 106 may be used to instantiate food taxonomy 112 (with, for example, restaurant-specific instances of menu items and order data corresponding to the menu items).

Food quality predictive model 118 is a model of the quality of food items that is created using predictive quality measures and the data items that evidence the predictive quality measures, as determined by probabilistic or statistical computations. As used in this disclosure model may refer to computer-implemented data structure(s) and/or computer code that store and enable access to information about data items including links or relationships between different data items. For instance, predictive model 118 may contain many instances of quality measures (data values) that are computed over time and links between the quality measures and specific sets of reorder data for menu items of specific restaurants.

As described in more detail below, food analytics subsystem 170 creates predictive model 118 by using food taxonomy 112 to group food order data 106 according to label(s) such as menu item, menu item category, dish, dish category, or restaurant class, aggregating reorder data for the groups of food items associated with the labels, and executing predictive algorithm(s) on the groups of reorder data to produce quality measures.

Food delivery system 120 when executed by a processor enables scheduling of pick-up or deliveries of orders received by product ordering system 108. As such, food delivery system 120 communicates with product ordering system 108 over network 160. Food delivery system 120 can be implemented as a generic delivery service or as a domain-specific product delivery system. For example, food delivery system 120 may be configured specifically for scheduling and tracking delivery of made-to-order food items.

Configuring Information Search and Retrieval

Figure 1E:
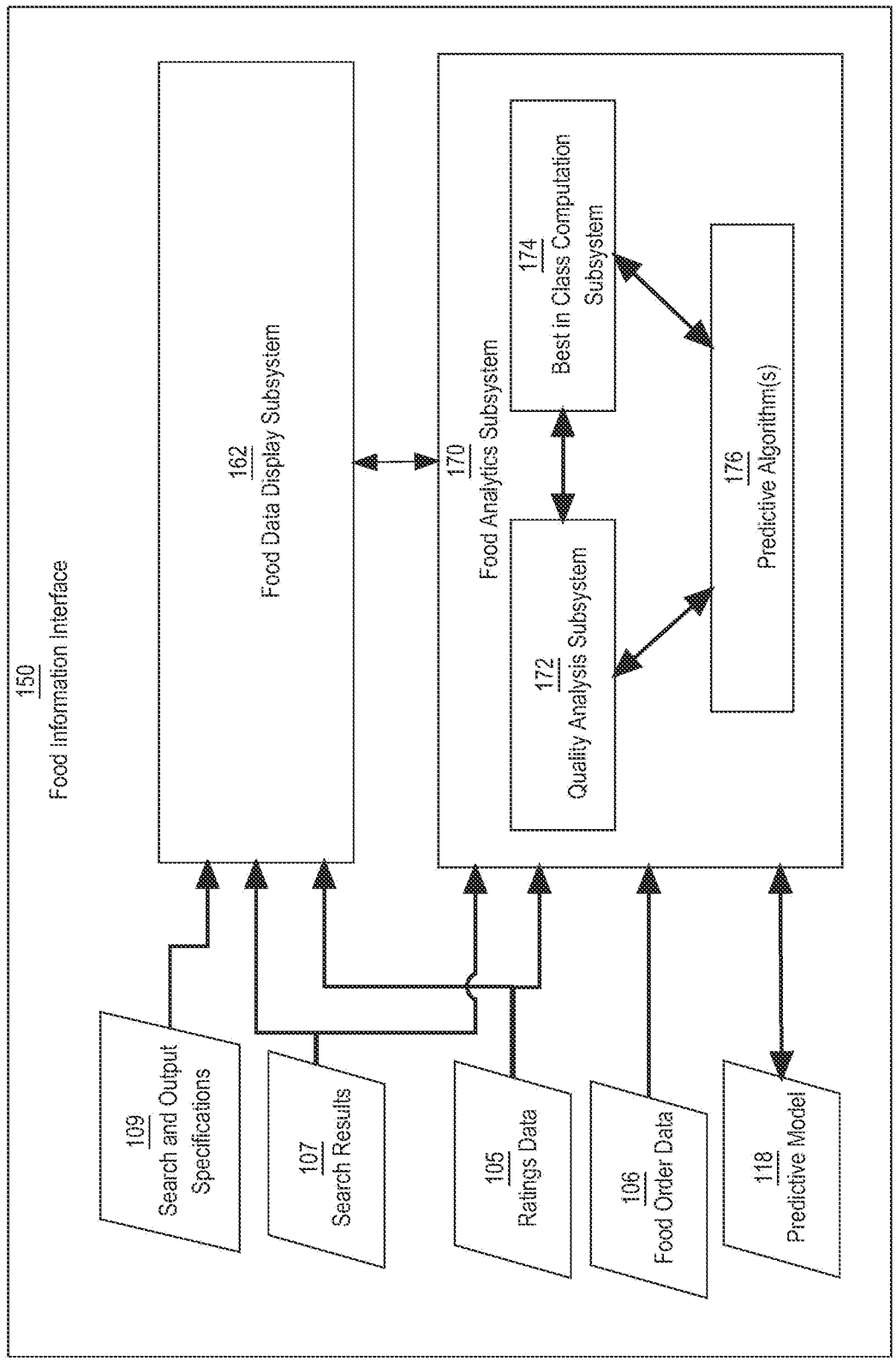
FIG. 1E is an example block diagram illustrating one or more embodiments of the food information interface of FIG. 1A.

FIG. 1E is an example block diagram illustrating one or more embodiments of the food information interface of FIG. 1D.

Food information interface 150 and its components include combinations of computer-implemented functionality, logic, data structures, and digital data. The example food information interface 150 includes a food data display subsystem 162 and a food analytics subsystem 170. The example food analytics subsystem 170 includes a quality analysis subsystem 172, a best in class computation subsystem 174 and predictive algorithm(s) 176. Food information interface 150 utilizes input data, which may be obtained from other sources over network 160, including food order data 106, ratings data 105, search results 107 and search and output specifications 109.

Food data display subsystem 162 communicates with search engine 104 and/or product ordering system 108 over network 160 to configure information search, retrieval and browsing functionality according to predictive quality measures that are generated by food analytics subsystem 170. For instance, food data display subsystem 162 modifies output specifications 109 for the display of search results 107 in accordance with certain predictive measures generated by food analytics subsystem 170.

Search results 107 include a list of references to data items retrieved by search engine 104 in response to a query such as a keyword or natural language (speech or text) search. Search results 107 can include names of restaurants or other food providers and/or names of food items offered by particular restaurants. Search results 107 can include text, graphics, and/or interactive elements such as buttons or hyperlinks.

Ratings data 105 includes qualitative information associated with items of search results 107. For example, ratings data 105 may include numerical or star ratings, free text comments, or other subjective information.

Search and output specifications 109 include runtime specifications for executing search queries and displaying search results and related data (such as ratings data 105), such as coordinate data for on-screen spatial arrangements and ranking data for sequential orderings of data items. Food data display subsystem 162 uses predictive quality measures generated by food analytics subsystem 170 to modify search and output specifications 109.

Examples of ways in which the predictive quality measures generated by food analytics subsystem 170 can be used include modifying a search query to include a predictive quality measure (such as a minimum or average quality measure) as a filter, ranking of search results 107, modifying the timing of searching or the order of display of certain search results 107, or modifying a graphical component of a visualization of the search results 107 (for instance, by adding graphical quality indicators to the display of certain search results 107).

As another example, predictive quality measures can be used by food data display subsystem 162 in communication with search engine 104 and/or product ordering system 108 to proactively generate electronic recommendations. For instance, if, based on a history of user interactions as may be indicated by user interaction data such as historical food order data 106, product ordering system 108 learns that a certain computer account frequently places orders for egg rolls at lunchtime, then, using data collected by computing device 140 (such as date, time and geographic location, where location data may be obtained from sensor data), at lunchtime product ordering system 108 can generate an automated recommendation for a nearby restaurant whose egg rolls have a positive quality measure.

Food Quality Analytics

In the example of FIG. 1E, predictive algorithm(s) 176 are executed by quality analysis subsystem 172 and best in class computation subsystem 174 to generate the predictive quality measures that are used to configure information search and retrieval and/or product ordering functionality as described above. Quality analysis subsystem 172 and best in class computation subsystem 174 may operate using offline processing to continuously or periodically generate and update the predictive quality measures or may operate online for example in response to a search query or other input data.

Quality analysis subsystem 172 computes quality measures based on reorder data for particular menu items offered by particular food providers through product ordering system 108. Best in class computation subsystem 174 aggregates and normalizes the menu item quality measures for groups of menu items associated with particular categories or classes, such as dish. In other words, best in class computation subsystem 174 computes relative quality measures. For example, if a Thai restaurant offers chicken pad Thai, shrimp pad Thai, and vegetarian pad Thai, then quality analysis subsystem 172 can generate quality measures for each of these menu items based on the reorder data for each of the individual menu items. If multiple restaurants in a geographic location (such as a delivery area) serve a similar dish, then quality analysis subsystem 172 can generate menu item-level quality measures for the comparable dishes offered by the different restaurants within the geographic area and normalize the quality measures across the different restaurants in the area. For instance, a diner could want to order the best Pad Thai in 'mid-town Manhattan' (a delivery area) and the disclosed technologies can recommend a restaurant based on the analyses described herein.

Predictive algorithm(s) 176 used by quality analysis subsystem 172 to generate reorder scores can include a Bayesian framework using a Dirichlet distribution, where the posterior distribution can be the reorder counts of each menu item in the last 'n' time interval. Using the Bayesian framework, a predicted reorder score for a menu item can be obtained by computing $$E(p_i \mid O) = \frac{a_i^l}{\sum_{i=1}^{5} a_i^l}$$

where $p_i$ is a conditional random variable in a set of random variables $(p_1, \ldots, p_k)$ whose value is dependent on condition O, $\alpha_i$ is parameter in a set of independent prior distribution parameters $(\alpha_1, \ldots, \alpha_k)$ and l is the number of observations in the time period n. The parameters $\alpha$ can be estimated from a set of training data using for example a maximum-likelihood estimate.

Using the Bayesian framework and an optimized time period 'n' can facilitate adjusting the reorder scores to observe the rise and fall of quality due to time-dependent but perhaps implicit influencers. For example, if the chef in a restaurant has changed, a decline in reorders may suggest that the menu item doesn't taste as good anymore. The Bayesian framework dynamically adjusts for these and other dynamic quality characteristics.

For instance, other scenarios that can be modeled using the disclosed approaches include: normalizing reorder scores by neighborhood or delivery area and dish type, newly introduced menu items or other menu items that have a small number of reorders, dynamic changes in reorder behavior due to various factors including external events such as closing or opening of a competitor restaurant, high reorder volume menu items (such as cheese pizza, perhaps) (where traditional methods would simply equate high order volume with popularity, the disclosed approaches can reduce the influence of order volume).

While this disclosure refers to a specific implementation using a Bayesian framework, the described implementation is offered only as an example and the disclosed technologies can be implemented using other methodologies or with variations on the disclosed approaches.

The quality analysis subsystem 172 uses the menu item quality measures, which may be referred to as predictive reorder scores or simply reorder scores, computed as described above, to select the best-quality menu item offered by the restaurant in each class (e.g., dish) of menu items offered by the restaurant. For example, if the class (dish) is Salads, and the restaurant offers menu items including Caesar salad, House Salad, and Beet salad, quality analysis subsystem 172 determines which of these menu items has the highest mathematical likelihood of being reordered by computer accounts in a given population of computer accounts and uses that computation as a measure of quality of the menu item. The population of user accounts used as the basis for the quality measure may be determined by geographic location data or other suitable criteria, for example, demographic data or preference data.

The food data display subsystem 162 can use the class-based predictive quality measure to highlight the so-called best in class menu item when displaying the list of menu items of the class, or to sort a list of menu items in a set of search results 107 so that the best in class menu item(s) appear at the top of a list of search results, or to automatically generate an electronic notification recommending the best in class menu item when a query or preference for salad more generally is detected.

To separate best in class menu items from lower-quality menu items, quality analysis subsystem 172 can use a statistical test, such as a chi-square test, to examine differences with categorical variables. One implementation of the chi-square test that may be used for this purpose is the chi-square automatic interaction detector (CHAID) algorithm, although other algorithms can be used. While this disclosure refers to a specific implementation using for example a CHAID algorithm, the described implementation is offered only as an example and the disclosed technologies can be implemented using other methodologies or with variations on the disclosed approaches.

Best in class computation subsystem 174 aggregates the menu item-level reorder scores for all of the menu items in the Salad class offered by each of the N restaurants and normalizes the aggregated menu item-level reorder scores using for example the l1-norm. To determine whether an aggregated normalized reorder score is high enough to be considered best in class, relative to the aggregated normalized reorder scores for each of the other (N−1) restaurants in the region, the best in class computation subsystem 174 uses a predictive algorithm 176, such as the CHAID algorithm, to determine a threshold level that is used for comparison to the computed reorder scores.

To conserve computing resources and improve reliability of the reorder scores, for example, best in class computation subsystem 174 may execute the predictive (e.g., CHAID) algorithm only using data for restaurants that have a certain threshold number of orders, where the threshold number of orders may be a number of orders that would place the restaurant in the top X % of the N restaurants based on order volume. If a restaurant's order volume does not meet the order volume threshold it may be excluded from the restaurant-level best in class calculations.

For the subset of the N restaurants that meet the order volume threshold, best in class computation subsystem 174 can use the predictive (e.g., CHAID algorithm) to generate a threshold value that is used to determine whether a restaurant's normalized restaurant-level reorder score is high enough to be considered best in class. Best in class computation subsystem 174 can perform similar computations to determine a best restaurant in a geographic region across all classes, by aggregating the restaurant-level reorder scores across all dishes served by the set of restaurants in a given region.

In some implementations, best in class computation subsystem 174 may use a combination of the computed best in class predictive measures and ratings data 105 to make best in class determinations. To do this, best in class computation subsystem 174 may calculate a restaurant-level rating score for a class (dish) based on ratings data 105 and compare the calculated rating score to a threshold rating value, where the threshold rating value may be determined based on requirements of a specific design.

For example, a rating score of 3.5 out of 5 may be set as a threshold rating value that is used to perform the best in class determination. Best in class subsystem 174 may make a best in class determination based on whether the calculated rating score is greater than or equal to the threshold rating value and whether the predictive reorder score is greater than or equal to the (for example CHAID-determined) reorder threshold value. If both of these criteria are met, a restaurant may be tagged by best in class subsystem 174 as best in class for the class (dish).

Tagging or labeling as used in this disclosure may refer to creating an electronic annotation such as by adding metadata to a file or data record.

Figure 2A:
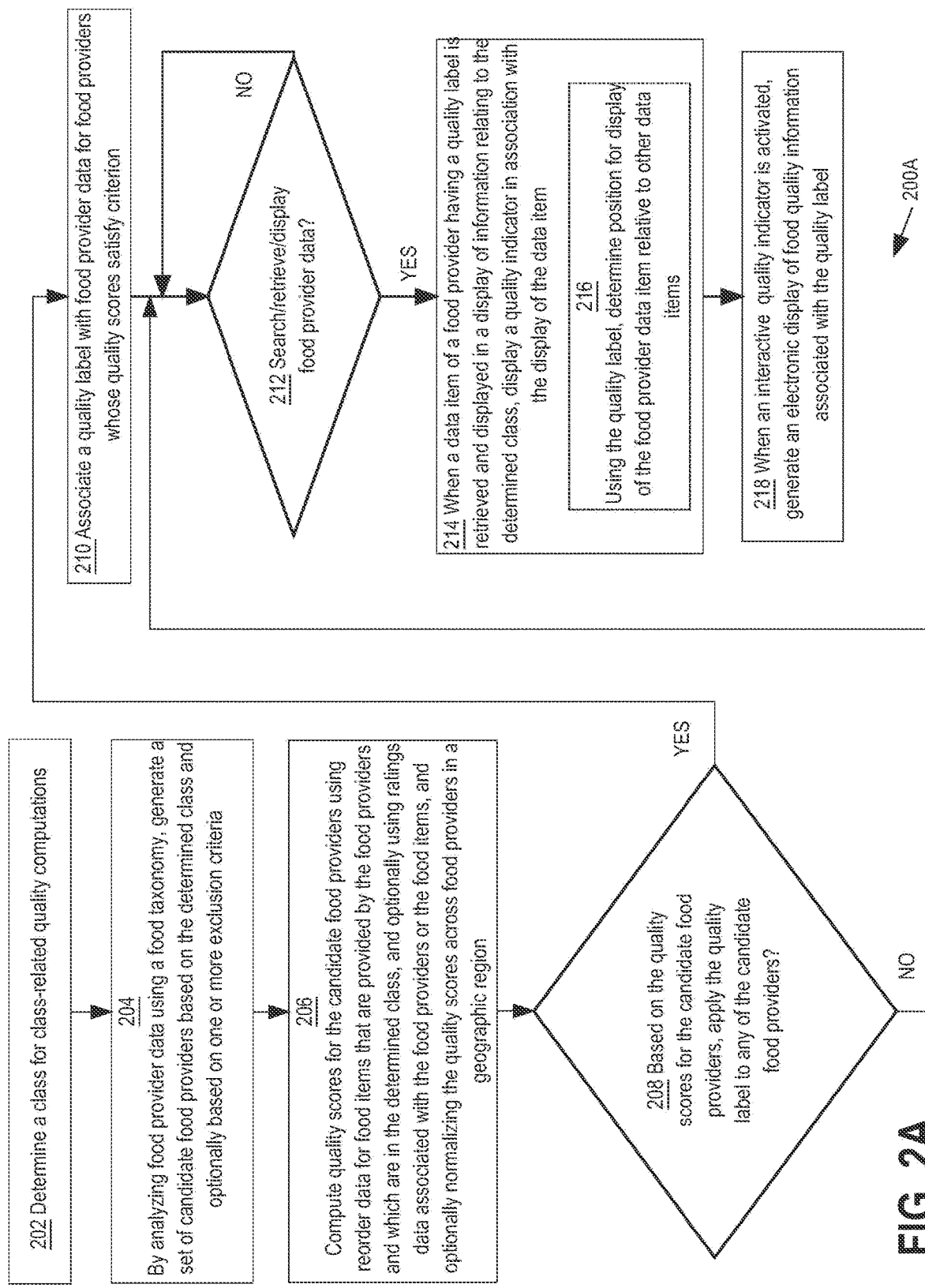
FIG. 2A is an example flow diagram of a process that may be executed by one or more components of the computing environment of FIG. 1D.

FIG. 2A is a simplified flow diagram of an embodiment of operations that can be performed by one or more components of a computing environment. For purposes of illustrating a clear example, FIG. 2A is described in the context of computing system 100 and food information interface 150, but other embodiments may use other environments or implemented techniques. The operations of a flow 200A as shown in FIG. 2A can be implemented using processor-executable instructions that are stored in computer memory. For purposes of providing a clear example, the operations of FIG. 2A are described as performed by computing device(s) 110, 140, which may be individually or collectively referred to as simply 'computing device.'

FIG. 2A relates to generation of class-level quality measures such as dish-level and restaurant-level best in class indicators. In operation 202, computing device determines a class for class-related quality computations. Class may be determined for example based on input data such as a query term or based on processing specifications for offline generation and/or updating of the quality measures. Whereas operations 204-210 typically occur in an offline mode, operations 212-218 typically occur during an online/live operation of the computing system 100, however any or all of operations 204-218 may occur in either an offline or online/live execution environment.

In operation 204, computing device generates a set of candidate food providers based on the class that is determined in operation 202 and optionally based on one or more exclusion criteria. Examples of exclusion criteria are geographic location and order volume. Referring to an illustration mentioned above, the set of candidate food providers generated in operation 204 may be the N restaurants in Lower Manhattan that serve Salads.

In operation 206, computing device computes the predictive quality scores (for example reorder scores) for the candidate food providers identified in operation 204. To do this, computing device uses reorder data for food items that are provided (offered for sale) by the candidate food providers in the class identified in operation 202. In doing so, computing device may use ratings data associated with the candidate food providers or ratings data associated with individual food items (such as ratings data 105).

In some implementations, computing device normalizes the quality scores of food providers across locations in a geographic region to account for non-uniformity of reorder distributions across locations. To do this, computing device may normalize by using, for example, the L2 norm, which is the square root of the sum of squares of all the reorder scores within a class. Median and average distributions across menu items in a class (dish) may also be used for normalization.

In operation 208, computing device determines, based on the results of the computations performed in operation 206, whether to label any of the candidate food providers with a quality label (for example, a best in class label). To do this, computing device compares the results of the above-described computations to one or more threshold criteria (such as those described above). When the comparison is successful, computing device proceeds to operation 210 and associates a food quality label with food provider data of the food provider(s) whose quality scores satisfy the threshold criteria, and then proceeds to operation 212. When the comparison is not successful, computing device proceeds directly to operation 212.

In operation 212, computing device waits for a signal or command to retrieve and/or display food provider data, such as to execute a search query or retrieve or display search results 107. If no such signal or command is received, computing device remains in operation 212, for example periodically listening for a signal. If a search, retrieve or display signal or command is received in operation 212, computing device proceeds to operation 214.

In operation 214, computing device configures a search, retrieval or display operation, as the case may be, based on the command or signal received in operation 212, in accordance with the predictive quality measures computed in operation 206. For example, when food provider data is retrieved by a search query, operation 214 determines whether the food provider data associated with a particular food provider identifier has a quality label assigned to it.

When food provider data having a quality label is to be displayed in a display device, operation 214 causes the display device to display a quality indicator in association with the food provider data. In doing so, operation 216 may determine a position for display of the food provider data associated with the quality label relative to other food provider data retrieved by the query. That is, operations 214 and/or 216 may cause a display device to display food provider data according to a spatial and/or sequential arrangement or using particular graphical elements, which may be specified in search and output specifications 109.

Similarly, although not shown specifically in FIG. 2A, operation 214 may configure a search query or information retrieval operation using quality scores computed in operation 206, for example by adding a quality score filter to the query.

In operation 218, computing device is responsive to activation of an interactive quality indicator. For example, if in operations 214-216 a quality indicator is displayed (for example, adjacent to food provider data associated with a quality label), and the displayed quality indicator is interactive, then in operation 218, computing device responds to activation of the interactive quality indicator by generating an electronic display of food quality information that is associated with the quality label that is assigned to the food provider data.

In this way, computing device provides functionality that allows display of the quality information that was used by computing device to determine to assign a quality label to the food provider data. For instance, computing device causes display device to display all of the menu items having quality measures that contributed to the food provider (restaurant-level) quality label. In other words, operation 218 enables computing device to help an end user understand the evidentiary basis for the assignment of the quality label to the food provider and thereby improve the level of trust that the end user has in the food quality computations that are performed by the computing device.

Figure 2B:
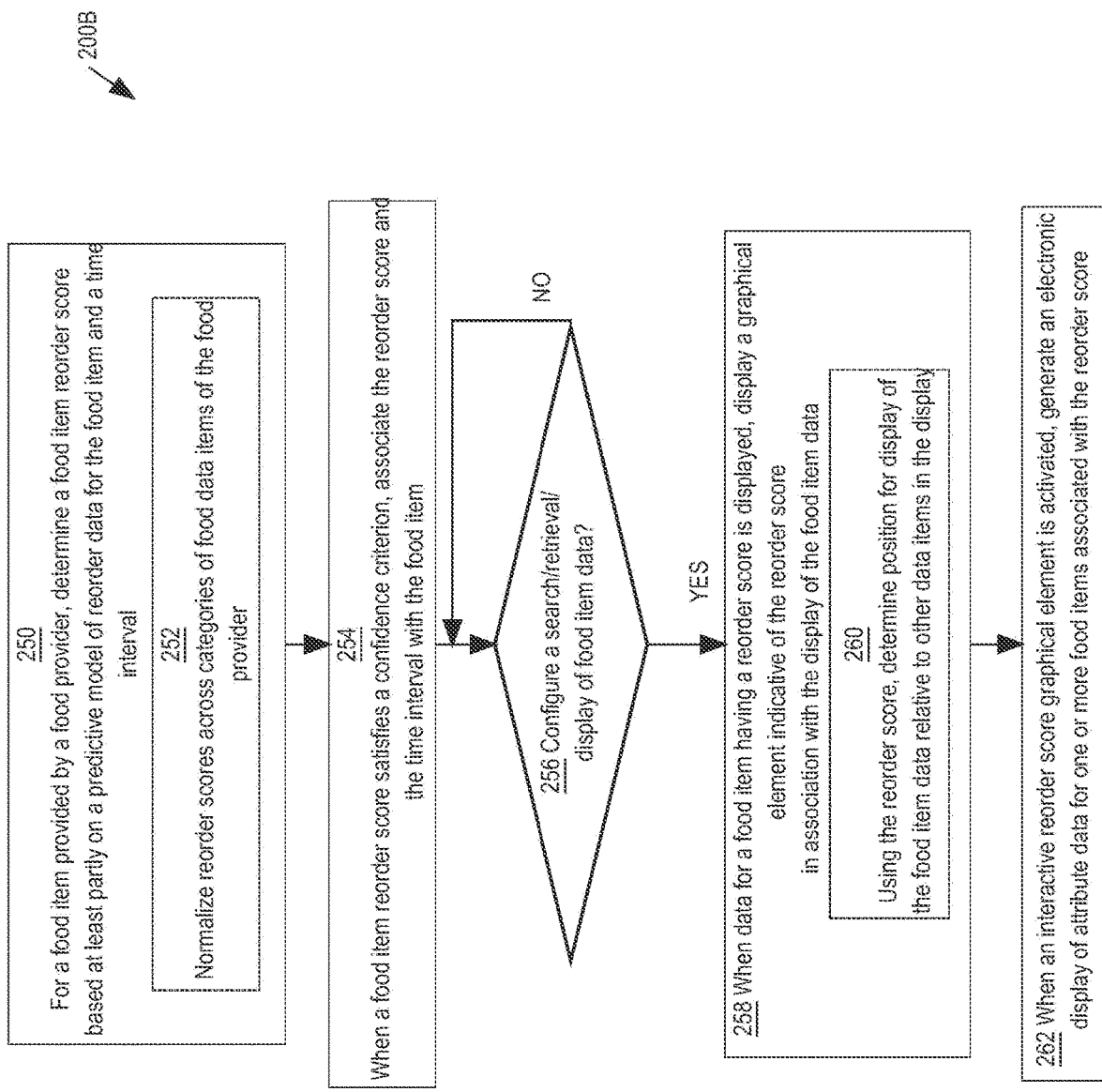
FIG. 2B is an example flow diagram of another process that may be executed by one or more components of the computing environment of FIG. 1D.

FIG. 2B is a simplified flow diagram of an embodiment of operations that can be performed by one or more components of a computing environment. For purposes of illustrating a clear example, FIG. 2B is described in the context of computing system 100 and food information interface 150, but other embodiments may use other environments or implemented techniques. The operations of a flow 200B as shown in FIG. 2B can be implemented using processor-executable instructions that are stored in computer memory. For purposes of providing a clear example, the operations of FIG. 2B are described as performed by computing device(s) 110, 140, which may be individually or collectively referred to as simply 'computing device.'

FIG. 2B illustrates a process for configuring a search, retrieval or display of food-related data according to menu item-level reorder data. Whereas operations 250-254 typically occur in an offline mode, operations 256-262 typically occur during an online/live operation of the computing system 100, however, any or all of operations 250-262 may occur in either an offline or an online/live execution environment.

In operations 250-254, computing device performs online or offline processing to determine whether any food items in a set of food items should be tagged with a quality label, using the methods described in this disclosure. For example, operation 250 determines a food item quality score for one or more food items of a food provider in a class or across multiple classes. The set of food items (menu items) may be associated with a particular class (dish). The food item quality score is computed using a predictive model of reorder data for the food item. The predictive model may be created using the approaches described above or other similarly suitable approaches.

In operation 252, computing device normalizes the food quality scores computed in operation 250 across categories of food data items of the food provider, using, for example, the total number of orders in each category to perform the normalization. Operation 252 allows the quality scores computed in operation 250 to be compared across categories having varying order volume or frequency. For instance, desserts may have a lower total order volume than main dishes and operation 252 accounts for this non-uniformity.

In operation 254, computing device assigns a quality label to a food item when the food item's quality score as computed in operations 250-252 satisfies the one or more criteria for receiving the quality label. To do this, computing device compares at least the food item quality score to a threshold value. The threshold criteria and computation of threshold values may be performed using the techniques described above or any other similarly suitable methods.

In operation 256, computing device waits for a signal or command to retrieve and/or display food item data, such as to execute a search query or retrieve or display search results 107, or to display food quality information as in operation 218. If no such signal or command is received, computing device remains in operation 256, for example periodically listening for a signal. If a search, retrieve or display signal or command is received in operation 256, computing device proceeds to operation 258.

In operation 258, computing device configures a search, retrieval or display operation, as the case may be, based on the command or signal received in operation 256, in accordance with the predictive quality measures computed in operations 250-252. For example, when food item data is retrieved by a search query, operation 258 determines whether the food item data associated with a particular food item identifier has a quality label assigned to it.

When food item data having a quality label is to be displayed in a display device, operation 258 causes the display device to display a quality indicator in association with the food item data. In doing so, operation 260 may determine a position for display of the food item data associated with the quality label relative to other food item data retrieved by the query. That is, operations 258 and/or 260 may cause a display device to display food item data according to a spatial and/or sequential arrangement or using particular graphical elements, which may be specified in search and output specifications 109.

Similarly, although not shown specifically in FIG. 2B, operation 258 may configure a search query or information retrieval operation using quality scores computed in operations 250-252, for example by adding a quality score filter to the query.

In operation 262, computing device is responsive to activation of an interactive quality indicator. For example, if in operations 258-260 a quality indicator is displayed (for example, adjacent to food item data associated with a quality label), and the displayed quality indicator is interactive, then in operation 262, computing device responds to activation of the interactive quality indicator by generating an electronic display of attribute data that is associated with the quality label that is assigned to the food item data.

In this way, computing device provides functionality that allows display of the quality information that was used by computing device to determine to assign a quality label to the food item data. For instance, computing device causes display device to display all of the menu items having quality measures that contributed to the food item (e.g., menu item category or dish-level) quality label. In other words, operation 218 enables computing device to help an end user understand the evidentiary basis for the assignment of the quality label to the food item and thereby improve the level of trust that the end user has in the food quality computations that are performed by the computing device.

Presentation of Food Data

Figure 3:
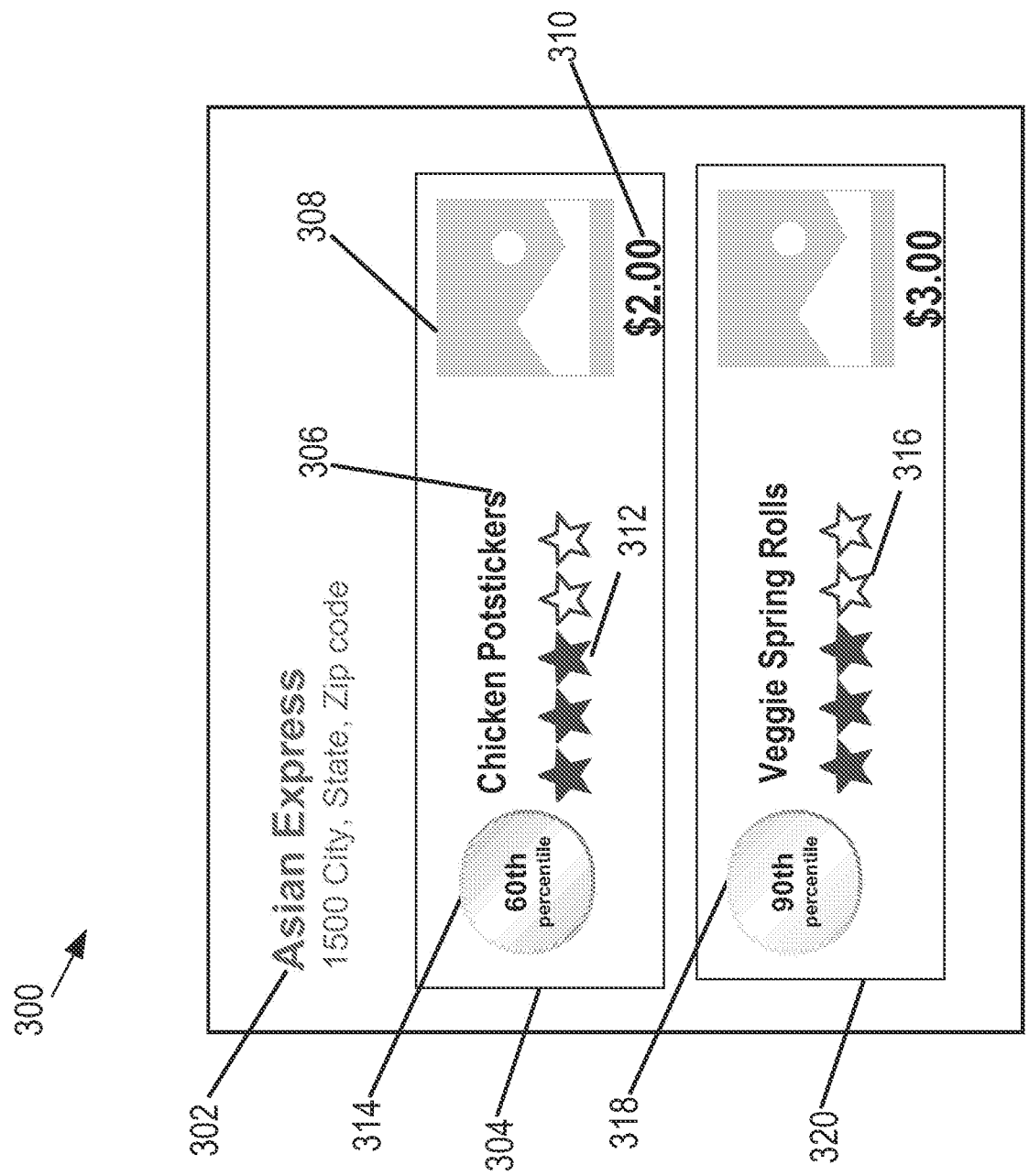
FIG. 3 is an example of a graphical interface that may be generated and displayed by one or more components of the computing environment of FIG. 1D.

FIG. 3 is an example of a graphical interface that may be generated and displayed by one or more components of the computing environment of FIG. 1D. In an embodiment, GUI 300 may be displayed by computing device 140 implementing portions of food information interface 150.

GUI 300 shows a visual representation of food-related data that may be displayed by display device in response to execution of a search query including the keyword Asian and selection of Asian Express from a list of food providers displayed in search results for that query. GUI 300 includes food provider data 302 and instances 304, 320 of food item (menu item) data. As shown for instance 304, the instances of food item data include food item name (306), a graphic (such as a digital image of the food item) 308, price 310. Each instance of food item data 304, 320 also includes subjective ratings data 312, 316 and predictive quality measures graphical elements 314, 318.

The graphical elements 314, 318 represent predictive quality measures computed as described above. For example, graphical elements 314, 318 may indicate that the chicken pot stickers offered by Asian Express have a 40% likelihood of being reordered while the veggie spring rolls offered by Asian Express have only a 20% likelihood of being reordered. Graphical elements 314, 318 may be interactive such that activation (selection) of the element with for example a tap on a touchscreen causes GUI 300 to display more detailed information about the reorder score quality computations.

Figure 4:
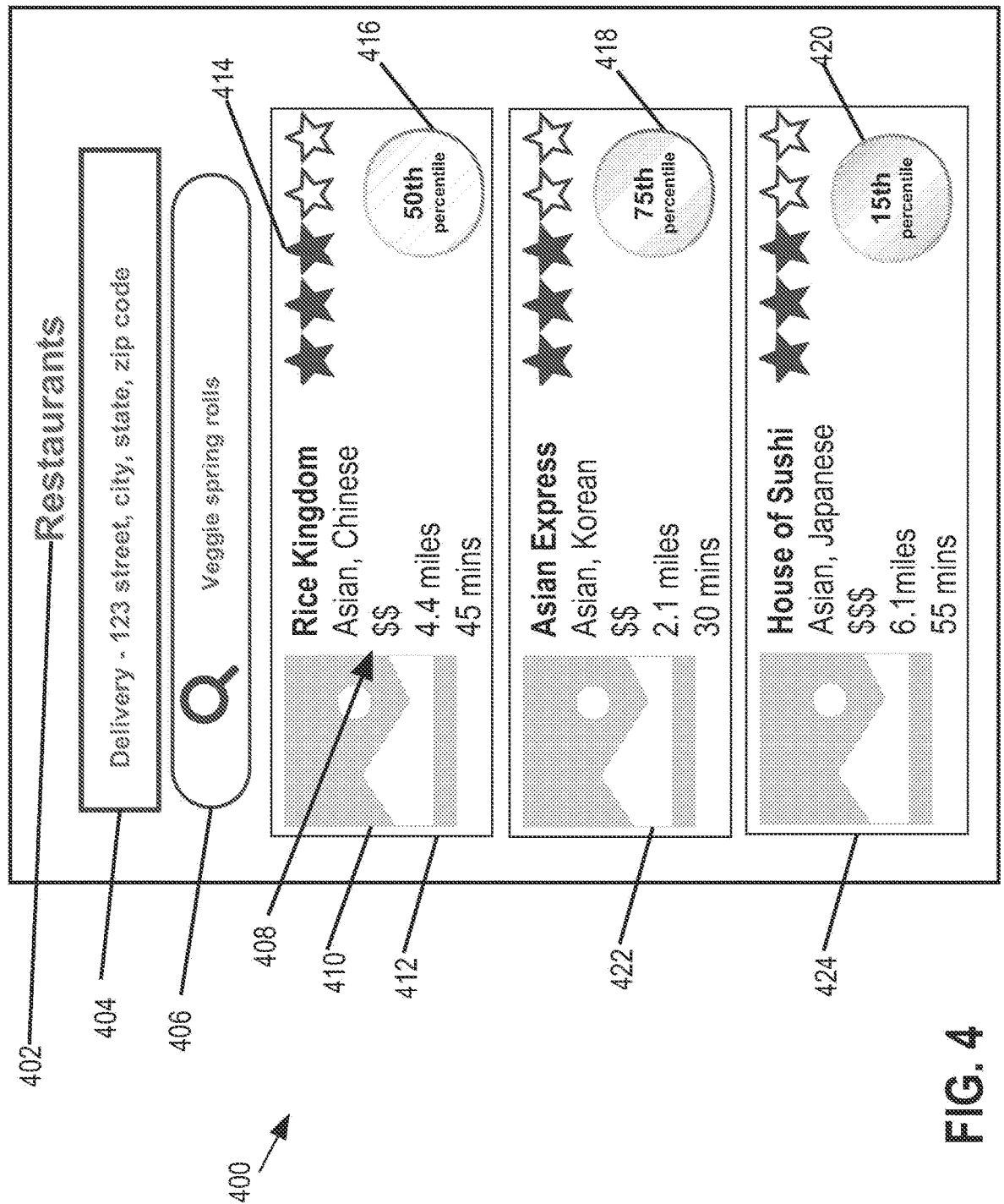
FIG. 4 is an example of another graphical interface that may be generated and displayed by one or more components of the computing environment of FIG. 1D.

FIG. 4 is a simplified illustration of another graphical interface (GUI). In an embodiment, GUI 400 may be displayed by computing device 140 implementing portions of food information interface 150.

GUI 400 shows a visual representation of food-related data that may be displayed by display device in response to execution of a search query for restaurants, where the query includes the search terms veggie spring rolls. GUI 300 includes a title of the display screen 402, a location dialog box 404 and a query input block 406. In response to execution of the veggie spring rolls query, GUI 400 displays food provider (restaurant) data items 412, 422, 424, which include information for restaurants within a certain range of the location in location box 404. Food provider data item 412, 422, 424 includes food provider data 408 (such as restaurant name, categories, price level, distance from location, and estimated wait time). Each instance of food provider data 412, 422, 424 also includes subjective ratings data (for example 414) and predictive quality measures graphical elements, 416, 418, 420.

The graphical elements 416, 418, 420 represent predictive quality measures computed as described above. For example, graphical elements 416, 418, 420 may indicate that Rice Kingdom has a 35% likelihood that its Asian food or more specifically veggie spring rolls will be reordered while Asian Express has a 30% likelihood that its Asian food or more specifically veggie spring rolls will be reordered and House of Sushi only has a 15% likelihood that its Asian food or more specifically veggie spring rolls will be reordered.

Graphical elements 416, 418, 420 may be interactive such that activation (selection) of the element with for example a tap on a touchscreen causes GUI 400 to display more detailed information about the reorder score quality computations. For instance, tapping on graphical element 418 may cause display device to display GUI 300 shown in FIG. 3.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
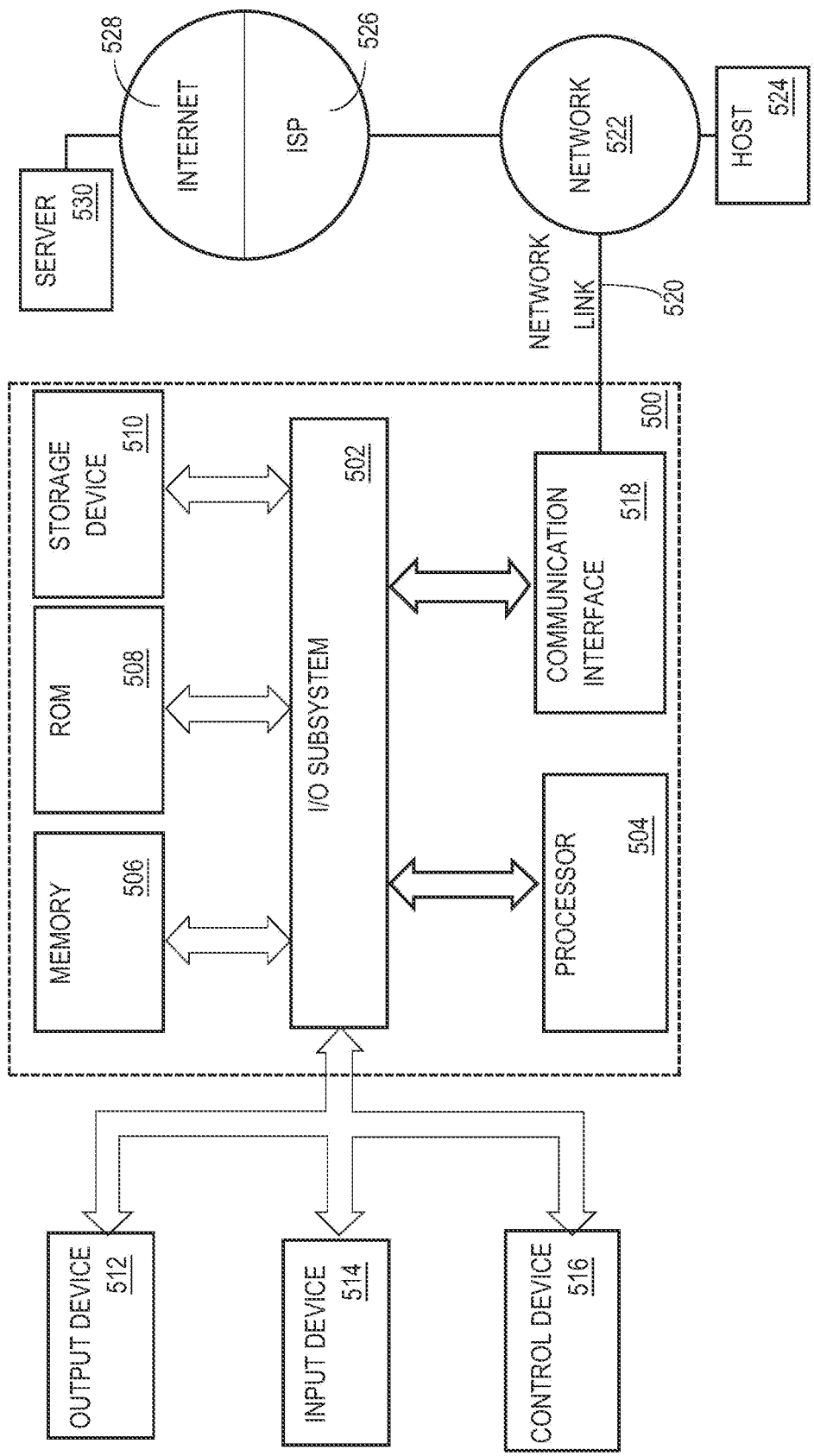
FIG. 5 is an example block diagram illustrating an embodiment of a hardware environment, which may be used to implement various aspects of the computing environment of FIG. 1D.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infrared data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any at least one, and any combination of, the examples described below.

In an example 1, a computer-implemented method for providing improved search and retrieval of made-to-order menu item data using a computing device that is communicatively coupled to a product ordering computer includes determining a set of menu item data, an instance of menu item data in the set of menu item data comprising menu item identifier data and restaurant identifier data, the menu item data identifying a made-to-order food product that can be ordered through the product ordering computer, the restaurant identifier data identifying a restaurant; obtaining food order data from the product ordering computer, the food order data comprising numerical values indicating a number of times that food products comprising food data items that have been reordered during a time interval using restaurants that are identified in the restaurant identifier data; using at least some of the food order data, at least some of the menu item data, and a food taxonomy communicatively coupled to the computing device, computing reorder scores for made-to-order food products having food data items that are provided by restaurants identified in the restaurant identifier data; when a set of reorder scores satisfies a reorder confidence criterion, causing, by a food information interface communicatively coupled to the computing device, tagging a subset of the menu item data with a quality label, the subset comprising menu item data that is associated with the set of reorder scores that satisfies the reorder confidence criterion; using the quality label to configure a search, retrieval, or display operation executed by the computing device.

An example 2 includes the subject matter of example 1, and includes, using the food order data, creating a predictive model of quality of the made-to-order food products; using the predictive model, generating the reorder scores.

An example 3 includes the subject matter of example 1 or example 2, and includes, using one or more exclusion criteria, determining the set of menu item data; normalizing the reorder scores across the set of menu item data.

An example 4 includes the subject matter of any of the preceding examples, and includes, using a statistical test, determining when the set of reorder scores satisfies a reorder confidence criterion.

An example 5 includes the subject matter of any of the preceding examples, and includes, using the reorder scores, computing a best in class score for a plurality of restaurants; when the best in class score for a restaurant satisfies a best in class confidence criterion, causing, by a graphical interface, displaying a subset of the menu item data that is associated with the restaurant having the best in class score that satisfies the best in class confidence criterion.

An example 6 includes the subject matter of any of the preceding examples, and includes, using one or more exclusion criteria, determining the set of menu item data; normalizing the best in class scores across the set of menu item data.

An example 7 includes the subject matter of any of the preceding examples, and includes displaying a visual representation of the subset of the menu item data that is associated with the set of reorder scores that satisfies the reorder confidence criterion; linking a graphical interface element with the visual representation of the subset of the menu item data that is associated with the set of reorder scores that satisfies the reorder confidence criterion.

An example 8 includes the subject matter of any of the preceding examples, and includes displaying a visual representation of the subset of the menu item data that is associated with the best in class score that satisfies the reorder confidence criterion; linking a graphical interface element with a visual representation of the subset of the menu item data that is associated with the best in class score that satisfies the best in class confidence criterion.

An example 9 includes the subject matter of any of the preceding examples, and includes, using the set of reorder scores, sorting the subset of the menu item data that is associated with the set of reorder scores that satisfies the reorder confidence criterion.

An example 10 includes the subject matter of any of the preceding examples, and includes, using sensor data that is received by a computing device that is coupled to the display device, detecting a geographic location; using the detected geographic location, generating the display of the subset of the menu item data that is associated with the set of reorder scores that satisfies the reorder confidence criterion.

An example 11 includes the subject matter of any of the preceding examples, and includes, using historical food order data that is associated with a computer account, determining a food class label that is descriptive of similar food items; using the food class label, determining the set of menu item data.

An example 12 includes the subject matter of any of the preceding examples, and includes, using historical interaction data that is associated with a computer account, determining the food class label.

An example 13 includes the subject matter of any of the preceding examples, and includes dynamically adjusting at least one of the reorder scores based on an implicit or an explicit quality influencer.

An example 14 includes the subject matter of any of the preceding examples, and includes dynamically adjusting at least one of the reorder scores based on a difference in order volume.

An example 15 includes the subject matter of any of the preceding examples, and includes dynamically adjusting at least one of the reorder scores based on recency of the food order data.

In an example 16, a system, for providing improved search and retrieval of made-to-order menu item data in a computing device that is communicatively coupled to a product ordering computer, includes one or more processors; a communication interface coupled to the one or more processors; one or more non-transitory computer-readable storage media coupled to the one or more processors and storing sequences of instructions, which when executed by the one or more processors, cause the one or more processors to: determine a set of menu item data, an instance of menu item data in the set of menu item data comprising menu item identifier data and restaurant identifier data, the menu item data identifying a made-to-order food product that can be ordered through the product ordering computer and comprising a food data item, the restaurant identifier data identifying a restaurant; obtain food order data from the product ordering computer, the food order data comprising numerical values indicating a number of times that food products comprising food data items have been reordered during a time interval using restaurants that are identified in the restaurant identifier data; using at least some of the food order data, at least some of the menu item data, and a food taxonomy communicatively coupled to the computing device, compute reorder scores for made-to-order food products having food data items that are provided by restaurants identified in the restaurant identifier data; when a set of reorder scores satisfies a reorder confidence criterion, cause, by a food information interface communicatively coupled to the computing device, tagging a subset of the menu item data with a quality label, the subset comprising menu item data that is associated with the set of reorder scores that satisfies the reorder confidence criterion; use the quality label to configure a search, retrieval, or display operation executed by the computing device.

An example 17 includes the subject matter of example 16, where the instructions, when executed by the one or more processors, cause the one or more processors to, using the food order data, create a predictive model of quality of the made-to-order food products; using the predictive model, generate the reorder scores.

An example 18 includes the subject matter of any of examples 16-17, where the instructions, when executed by the one or more processors, cause the one or more processors to, using one or more exclusion criteria, determine the set of menu item data; normalize the reorder scores across the set of menu item data.

An example 19 includes the subject matter of any of examples 16-18, where the instructions, when executed by the one or more processors, cause the one or more processors to, using a statistical test, determine when the set of reorder scores satisfies a reorder confidence criterion.

An example 20 includes the subject matter of any of examples 16-19, where the instructions, when executed by the one or more processors, cause the one or more processors to, using the reorder scores, compute a best in class score for a plurality of restaurants; when the best in class score for a restaurant satisfies a best in class confidence criterion, cause, by a graphical interface of the system, displaying a subset of the menu item data that is associated with the restaurant having the best in class score that satisfies the best in class confidence criterion.

An example 21 includes the subject matter of any of examples 16-20, where the instructions, when executed by the one or more processors, cause the one or more processors to, using one or more exclusion criteria, determine the set of menu item data; normalize the best in class scores across the set of menu item data.

An example 22 includes the subject matter of any of examples 16-21, where the instructions, when executed by the one or more processors, cause the one or more processors to display a visual representation of the subset of the menu item data that is associated with the set of reorder scores that satisfies the reorder confidence criterion; link a graphical interface element with the visual representation of the subset of the menu item data that is associated with the set of reorder scores that satisfies the reorder confidence criterion.

An example 23 includes the subject matter of any of examples 16-22, where the instructions, when executed by the one or more processors, cause the one or more processors to display a visual representation of the subset of the menu item data that is associated with the best in class score that satisfies the reorder confidence criterion; link a graphical interface element with a visual representation of the subset of the menu item data that is associated with the best in class score that satisfies the best in class confidence criterion.

An example 24 includes the subject matter of any of examples 16-23, where the instructions, when executed by the one or more processors, cause the one or more processors to, using the set of reorder scores, sort the subset of the menu item data that is associated with the set of reorder scores that satisfies the reorder confidence criterion.

An example 25 includes the subject matter of any of examples 16-24, where the instructions, when executed by the one or more processors, cause the one or more processors to, using sensor data that is received by a computing device that is coupled to the display device, detect a geographic location; using the detected geographic location, generate the display of the subset of the menu item data that is associated with the set of reorder scores that satisfies the reorder confidence criterion.

An example 26 includes the subject matter of any of examples 16-25, where the instructions, when executed by the one or more processors, cause the one or more processors to, using historical food order data that is associated with a computer account, determine a food class label that is descriptive of similar food items; using the food class label, determine the set of menu item data.

An example 27 includes the subject matter of any of examples 16-26, where the instructions, when executed by the one or more processors, cause the one or more processors to, using historical interaction data that is associated with a computer account, determine the food class label.

An example 28 includes the subject matter of any of examples 16-27, where the instructions, when executed by the one or more processors, cause the one or more processors to dynamically adjust at least one of the reorder scores based on an implicit or an explicit quality influencer.

An example 29 includes the subject matter of any of examples 16-28, where the instructions, when executed by the one or more processors, cause the one or more processors to dynamically adjust at least one of the reorder scores based on a difference in order volume.

An example 30 includes the subject matter of any of examples 16-29, where the instructions, when executed by the one or more processors, cause the one or more processors to dynamically adjust at least one of the reorder scores based on recency of the food order data.

In an example 31, a computer program product, for providing improved search and retrieval of made-to-order menu item data in a computing device that is communicatively coupled to a product ordering computer, includes one or more non-transitory computer readable storage media storing instructions which, when executed by one or more processors, cause the one or more processors to determine a set of menu item data, an instance of menu item data in the set of menu item data comprising menu item identifier data and restaurant identifier data, the menu item data identifying a made-to-order food product that can be ordered through the product ordering computer and comprising a food data item that is associated with the food class label, the restaurant identifier data identifying a restaurant; obtain food order data from the product ordering computer, the food order data comprising numerical values indicating a number of times that food products comprising food data items that have been reordered during a time interval using restaurants that are identified in the restaurant identifier data; using at least some of the food order data, at least some of the menu item data, and a food taxonomy communicatively coupled to the computing device, compute reorder scores for made-to-order food products having food data items that are provided by restaurants identified in the restaurant identifier data; when a set of reorder scores satisfies a reorder score confidence criterion, cause, by a food information interface communicatively coupled to the computing device, tagging a subset of the menu item data with a quality label, the subset comprising menu item data that is associated with the set of reorder scores that satisfies the reorder confidence criterion; use the quality label to configure a search, retrieval, or display operation executed by the computing device.

An example 32 includes the subject matter of example 31, where the instructions, when executed by the one or more processors, cause the one or more processors to, using the food order data, create a predictive model of quality of the made-to-order food products; using the predictive model, generate the reorder scores.

An example 33 includes the subject matter of any of examples 31-32, where the instructions, when executed by the one or more processors, cause the one or more processors to, using one or more exclusion criteria, determine the set of menu item data; normalize the reorder scores across the set of menu item data.

An example 34 includes the subject matter of any of examples 31-33, where the instructions, when executed by the one or more processors, cause the one or more processors to, using a statistical test, determine when the set of reorder scores satisfies a reorder score confidence criterion.

An example 35 includes the subject matter of any of examples 31-34, where the instructions, when executed by the one or more processors, cause the one or more processors to, using the reorder scores, compute a best in class score for a plurality of restaurants; when the best in class score for a restaurant satisfies a best in class confidence criterion, cause, by a graphical interface, displaying a subset of the menu item data that is associated with the restaurant having the best in class score that satisfies the best in class confidence criterion.

An example 36 includes the subject matter of any of examples 31-35, where the instructions, when executed by the one or more processors, cause the one or more processors to, using one or more exclusion criteria, determine the set of menu item data; normalize the best in class scores across the set of menu item data.

An example 37 includes the subject matter of any of examples 31-36, where the instructions, when executed by the one or more processors, cause the one or more processors to display a visual representation of the subset of the menu item data that is associated with the set of reorder scores that satisfies the reorder confidence criterion; link a graphical interface element with the visual representation of the subset of the menu item data that is associated with the set of reorder scores that satisfies the reorder confidence criterion.

An example 38 includes the subject matter of any of examples 31-37, where the instructions, when executed by the one or more processors, cause the one or more processors to display a visual representation of the subset of the menu item data that is associated with the best in class score that satisfies the reorder confidence criterion; link a graphical interface element with a visual representation of the subset of the menu item data that is associated with the best in class score that satisfies the best in class confidence criterion.

An example 39 includes the subject matter of any of examples 31-38, where the instructions, when executed by the one or more processors, cause the one or more processors to, using the set of reorder scores, sort the subset of the menu item data that is associated with the set of reorder scores that satisfies the reorder confidence criterion.

An example 40 includes the subject matter of any of examples 31-39, where the instructions, when executed by the one or more processors, cause the one or more processors to, using sensor data that is received by a computing device that is coupled to the display device, detect a geographic location; using the detected geographic location, generate the display of the subset of the menu item data that is associated with the set of reorder scores that satisfies the reorder confidence criterion.

An example 41 includes the subject matter of any of examples 31-40, where the instructions, when executed by the one or more processors, cause the one or more processors to, using historical food order data that is associated with a computer account, determine a food class label that is descriptive of similar food items; using the food class label, determine the set of menu item data.

An example 42 includes the subject matter of any of examples 31-41, where the instructions, when executed by the one or more processors, cause the one or more processors to, using historical interaction data that is associated with a computer account, determine the food class label.

An example 43 includes the subject matter of any of examples 31-42, where the instructions, when executed by the one or more processors, cause the one or more processors to dynamically adjust at least one of the reorder scores based on an implicit or an explicit quality influencer.

An example 44 includes the subject matter of any of examples 31-43, where the instructions, when executed by the one or more processors, cause the one or more processors to dynamically adjust at least one of the reorder scores based on a difference in order volume.

An example 45 includes the subject matter of any of examples 31-44, where the instructions, when executed by the one or more processors, cause the one or more processors to dynamically adjust at least one of the reorder scores based on recency of the food order data.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A computer-implemented method for providing improved search and retrieval of made-to-order menu item data using a computing device that is communicatively coupled to a product ordering computer, the method comprising:
   determining a set of menu item data, an instance of menu item data in the set of menu item data comprising menu item identifier data and restaurant identifier data, the menu item data identifying a made-to-order food product that can be ordered through the product ordering computer, the restaurant identifier data identifying a restaurant;
   obtaining food order data from the product ordering computer, the food order data comprising numerical values indicating a number of times that food products comprising food data items that have been reordered during a time interval using restaurants that are identified in the restaurant identifier data;
   using at least some of the food order data, at least some of the menu item data, and a food taxonomy communicatively coupled to the computing device, computing reorder scores for made-to-order food products having food data items that are provided by restaurants identified in the restaurant identifier data;
   when a set of reorder scores satisfies a reorder confidence criterion, causing, by a food information interface communicatively coupled to the computing device, tagging a subset of the menu item data with a quality label, the subset comprising menu item data that is associated with the set of reorder scores that satisfies the reorder confidence criterion;
   using the quality label to configure a search, retrieval, or display operation executed by the computing device.

2. The method of claim 1, comprising:
   using the food order data, creating a predictive model of quality of the made-to-order food products;
   using the predictive model, generating the reorder scores.

3. The method of claim 1, comprising:
   using one or more exclusion criteria, determining the set of menu item data;
   normalizing the reorder scores across the set of menu item data.

4. The method of claim 1, comprising:
   using a statistical test, determining when the set of reorder scores satisfies the reorder confidence criterion.

5. The method of claim 1, comprising:
   using the reorder scores, computing a best in class score for a plurality of restaurants;
   when the best in class score for a restaurant satisfies a best in class confidence criterion, causing, by a graphical interface, displaying a subset of the menu item data that is associated with the restaurant having the best in class score that satisfies the best in class confidence criterion.

6. The method of claim 5, comprising:
   using one or more exclusion criteria, determining the set of menu item data;
   normalizing the best in class scores across the set of menu item data.

7. The method of claim 1, comprising:
   displaying a visual representation of the subset of the menu item data that is associated with the set of reorder scores that satisfies the reorder confidence criterion;
   linking a graphical interface element with the visual representation of the subset of the menu item data that is associated with the set of reorder scores that satisfies the reorder confidence criterion.

8. The method of claim 1, comprising:
   displaying a visual representation of the subset of the menu item data that is associated with the best in class score that satisfies the reorder confidence criterion;
   linking a graphical interface element with a visual representation of the subset of the menu item data that is associated with the best in class score that satisfies the best in class confidence criterion.

9. The method of claim 1, comprising:
   using the set of reorder scores, sorting the subset of the menu item data that is associated with the set of reorder scores that satisfies the reorder confidence criterion.

10. The method of claim 1, comprising:
    using sensor data that is received by the computing device that is coupled to the display device, detecting a geographic location;
    using the detected geographic location, generating the display of the subset of the menu item data that is associated with the set of reorder scores that satisfies the reorder confidence criterion.

11. The method of claim 1, comprising:
    using historical food order data that is associated with a computer account, determining a food class label that is descriptive of similar food items;
    using the food class label, determining the set of menu item data.

12. The method of claim 11, comprising:
    using historical interaction data that is associated with the computer account, determining the food class label.

13. The method of claim 1, comprising:
    dynamically adjusting at least one of the reorder scores based on an implicit or an explicit quality influencer.

14. The method of claim 1, comprising:
    dynamically adjusting at least one of the reorder scores based on a difference in order volume.

15. The method of claim 1, comprising:
    dynamically adjusting at least one of the reorder scores based on a recency of the food order data.

16. A system for providing improved search and retrieval of made-to-order menu item data in a computing device that is communicatively coupled to a product ordering computer, the system comprising:
    one or more processors;
    a communication interface coupled to the one or more processors;
    one or more non-transitory computer-readable storage media coupled to the one or more processors and storing sequences of instructions, which when executed by the one or more processors, cause the one or more processors to:
    determine a set of menu item data, an instance of menu item data in the set of menu item data comprising menu item identifier data and restaurant identifier data, the menu item data identifying a made-to-order food product that can be ordered through the product ordering computer and comprising a food data item, the restaurant identifier data identifying a restaurant;
    obtain food order data from the product ordering computer, the food order data comprising numerical values indicating a number of times that food products comprising food data items have been reordered during a time interval using restaurants that are identified in the restaurant identifier data;

using at least some of the food order data, at least some of the menu item data, and a food taxonomy communicatively coupled to the computing device, compute reorder scores for made-to-order food products having food data items that are provided by restaurants identified in the restaurant identifier data;

when a set of reorder scores satisfies a reorder confidence criterion, cause, by a food information interface communicatively coupled to the computing device, tagging a subset of the menu item data with a quality label, the subset comprising menu item data that is associated with the set of reorder scores that satisfies the reorder confidence criterion;

use the quality label to configure a search, retrieval, or display operation executed by the computing device.

17. The system of claim 16, wherein the instructions, when executed by the one or more processors, cause the one or more processors to:

using the food order data, create a predictive model of quality of the made-to-order food products;

using the predictive model, generate the reorder scores.

18. The system of claim 16, wherein the instructions, when executed by the one or more processors, cause the one or more processors to:

using one or more exclusion criteria, determine the set of menu item data;

normalize the reorder scores across the set of menu item data.

19. The system of claim 16, wherein the instructions, when executed by the one or more processors, cause the one or more processors to:

using a statistical test, determine when the set of reorder scores satisfies the reorder confidence criterion.

20. The system of claim 16, wherein the instructions, when executed by the one or more processors, cause the one or more processors to:

using the reorder scores, compute a best in class score for a plurality of restaurants;

when the best in class score for a restaurant satisfies a best in class confidence criterion, cause, by a graphical interface of the system, displaying a subset of the menu item data that is associated with the restaurant having the best in class score that satisfies the best in class confidence criterion.

21. One or more non-transitory computer-readable storage media coupled to one or more processors and storing sequences of instructions for providing improved search and retrieval of made-to-order menu item data in a computing device that is communicatively coupled to a product ordering computer, which instructions when executed by the one or more processors, cause the one or more processors to:

determine a set of menu item data, an instance of menu item data in the set of menu item data comprising menu item identifier data and restaurant identifier data, the menu item data identifying a made-to-order food product that can be ordered through the product ordering computer and comprising a food data item, the restaurant identifier data identifying a restaurant;

obtain food order data from the product ordering computer, the food order data comprising numerical values indicating a number of times that food products comprising food data items have been reordered during a time interval using restaurants that are identified in the restaurant identifier data;

using at least some of the food order data, at least some of the menu item data, and a food taxonomy communicatively coupled to the computing device, compute reorder scores for made-to-order food products having food data items that are provided by restaurants identified in the restaurant identifier data;

when a set of reorder scores satisfies a reorder confidence criterion, cause, by a food information interface communicatively coupled to the computing device, tagging a subset of the menu item data with a quality label, the subset comprising menu item data that is associated with the set of reorder scores that satisfies the reorder confidence criterion;

use the quality label to configure a search, retrieval, or display operation executed by the computing device.

22. The media of claim 21, further comprising sequences of instructions which, when executed by the one or more processors, cause the one or more processors to: using the food order data, create a predictive model of quality of the made-to-order food products; using the predictive model, generate the reorder scores.

23. The system of claim 21, further comprising sequences of instructions which, when executed by the one or more processors, cause the one or more processors to: using one or more exclusion criteria, determine the set of menu item data; normalize the reorder scores across the set of menu item data.

24. The system of claim 21, further comprising sequences of instructions which, when executed by the one or more processors, cause the one or more processors to: using a statistical test, determine when the set of reorder scores satisfies the reorder confidence criterion.

25. The system of claim 21, further comprising sequences of instructions which, when executed by the one or more processors, cause the one or more processors to: using the reorder scores, compute a best in class score for a plurality of restaurants; when the best in class score for a restaurant satisfies a best in class confidence criterion, cause, by a graphical interface of the system, displaying a subset of the menu item data that is associated with the restaurant having the best in class score that satisfies the best in class confidence criterion.

26. A computer program product for providing improved search and retrieval of made-to-order menu item data in a computing device that is communicatively coupled to a product ordering computer, the computer program product comprising one or more non-transitory computer readable storage media storing instructions which, when executed by one or more processors, cause the one or more processors to:

determine a set of menu item data, an instance of menu item data in the set of menu item data comprising menu item identifier data and restaurant identifier data, the menu item data identifying a made-to-order food product that can be ordered through the product ordering computer and comprising a food data item, the restaurant identifier data identifying a restaurant;

obtain food order data from the product ordering computer, the food order data comprising numerical values indicating a number of times that food products comprising food data items that have been reordered during a time interval using restaurants that are identified in the restaurant identifier data;

using at least some of the food order data, at least some of the menu item data, and a food taxonomy communicatively coupled to the computing device, compute reorder scores for made-to-order food products having food data items that are provided by restaurants identified in the restaurant identifier data;

when a set of reorder scores satisfies a reorder score confidence criterion, cause, by a food information interface communicatively coupled to the computing device, tagging a subset of the menu item data with a quality label, the subset comprising menu item data that is associated with the set of reorder scores that satisfies the reorder confidence criterion;

use the quality label to configure a search, retrieval, or display operation executed by the computing device.

27. A computer-implemented method for providing improved search and retrieval of made-to-order menu item data using a computing device that is communicatively coupled to a product ordering computer, the method comprising:

determining a set of menu item data, an instance of menu item data in the set of menu item data comprising menu item identifier data and restaurant identifier data, the menu item data identifying a made-to-order food product that can be ordered through the product ordering computer, the restaurant identifier data identifying a restaurant;

obtaining food order data from the product ordering computer, the food order data comprising numerical values indicating a number of times that food products comprising food data items that have been reordered during a time interval using restaurants that are identified in the restaurant identifier data;

using at least some of the food order data, at least some of the menu item data, and a food taxonomy communicatively coupled to the computing device, computing reorder scores for made-to-order food products having food data items that are provided by restaurants identified in the restaurant identifier data;

when a set of reorder scores satisfies a reorder confidence criterion, causing, by a food information interface communicatively coupled to the computing device, tagging a subset of the menu item data with a quality label, the subset comprising menu item data that is associated with the set of reorder scores that satisfies the reorder confidence criterion;

in response to user activation of the quality label, configuring a display operation to display food quality information, wherein the food quality information is at least partly based on the food order data.

* * * * *